(12) United States Patent
Zhu et al.

(10) Patent No.: US 11,381,961 B2
(45) Date of Patent: Jul. 5, 2022

(54) METHOD, APPARATUS, NETWORK DEVICE, AND SYSTEM FOR RELEASING IP ADDRESS

(71) Applicant: HUAWEI TECHNOLOGIES CO., LTD., Guangdong (CN)

(72) Inventors: Qianghua Zhu, Beijing (CN); Ruizhi Liu, Beijing (CN); Yan Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 86 days.

(21) Appl. No.: 16/775,903

(22) Filed: Jan. 29, 2020

(65) Prior Publication Data

US 2020/0169871 A1 May 28, 2020

Related U.S. Application Data

(63) Continuation of application No. PCT/CN2018/097294, filed on Jul. 26, 2018.

(30) Foreign Application Priority Data

Jul. 31, 2017 (CN) .......................... 201710643427.7

(51) Int. Cl.
*H04W 8/26* (2009.01)
*H04W 76/20* (2018.01)
(Continued)

(52) U.S. Cl.
CPC ............. *H04W 8/26* (2013.01); *H04W 76/20* (2018.02); *H04L 61/2007* (2013.01); *H04L 61/2053* (2013.01)

(58) Field of Classification Search
None
See application file for complete search history.

(56) References Cited

U.S. PATENT DOCUMENTS

2012/0099586 A1* 4/2012 Cherian .............. H04L 61/2053
370/389
2012/0214492 A1 8/2012 Mihály et al.
(Continued)

FOREIGN PATENT DOCUMENTS

CN 101686563 A 3/2010
CN 102387558 A 3/2012
(Continued)

OTHER PUBLICATIONS

SA WG2 Meeting #120:"POU session association in SSC mode 2 and SSC mode 3", S2-171972, Mar. 27-31, 2017, Busan, Korea. (3 pages).

(Continued)

*Primary Examiner* — Lonnie V Sweet
(74) *Attorney, Agent, or Firm* — WHDA, LLP

(57) ABSTRACT

This application relates to the field of communications technologies. This application discloses a method, an apparatus, a network device, and a system for releasing an IP (Internet protocol) address, to resolve a problem that a time at which the IP address is released is not precise. The method includes: determining, by the first network device, that a PDU session anchor needs to be relocated from a first user plane function entity, where the first user plane function entity is the PDU session anchor of a first PDU session of a terminal; determining, by the first network device, that a first IP address of the terminal is no longer used, where the first IP address is an IP address used by the terminal in the first PDU session; and releasing, by the first network device, the first IP address.

13 Claims, 13 Drawing Sheets

(51) Int. Cl.
  *H04L 61/5007* (2022.01)
  *H04L 61/5053* (2022.01)

(56) References Cited

U.S. PATENT DOCUMENTS

| | | | |
|---|---|---|---|
| 2017/0180484 A1 | 6/2017 | Asveren et al. | |
| 2017/0290082 A1* | 10/2017 | Salkintzis | H04W 36/18 |
| 2019/0208465 A1* | 7/2019 | Mihaly | H04W 8/26 |
| 2020/0059989 A1* | 2/2020 | Velev | H04W 8/08 |

FOREIGN PATENT DOCUMENTS

| | | |
|---|---|---|
| CN | 102484827 A | 5/2012 |
| CN | 106851856 A | 6/2017 |
| KR | 100566988 B1 | 4/2006 |
| WO | 2006/059287 A1 | 6/2006 |
| WO | 2014/178602 A1 | 11/2014 |
| WO | 2017/023346 A1 | 2/2017 |

OTHER PUBLICATIONS

International Search Report dated Oct. 19, 2018, issued in counterpart application No. PCT/CN2018/097294, with English translation. (17 pages).

Office Action dated Dec. 27, 2019, issued in counterpart CN application No. 201710643427.7, with English translation. (30 pages).

"3rd Generation Partnership Project; Technical Specification Group Services and System Aspects; System Architecture for the 5G System; Stage 2 (Release 15)", 3GPP TS 23.501, No. V1.2.0, Jul. 26, 2017, XP051336684 (166 pages).

"3rd Generation Partnership Project; Technical Specification Group Services and System Aspects; Procedures for the 5G System; Stage 2 (Release 15)", 3GPP TS 23.502, No. V0.5.0, Jul. 14, 2017, XP051336671 (148 pages).

Extended (Supplementary) European Search Report dated Jun. 17, 2020, issued in counterpart EP Application No. 18840333.1 (8 pages).

* cited by examiner

METHOD, APPARATUS, NETWORK DEVICE, AND SYSTEM FOR RELEASING IP ADDRESS

CROSS-REFERENCE TO RELATED APPLICATIONS

This application is a continuation of International Application No. PCT/CN2018/097294, filed on Jul. 26, 2018, which claims priority to Chinese Patent Application No. 201710643427.7, filed on Jul. 31, 2017, the disclosures of the aforementioned applications are hereby incorporated by reference in their entireties.

TECHNICAL FIELD

This application relates to the field of communications technologies, and in particular, to a method, an apparatus, a network device, and a system for releasing an Internet protocol (IP) address.

BACKGROUND

A protocol data unit (PDU) session is accessed to a data network (DN) by using a PDU session anchor, and releasing an IP address is involved in a relocation process of the PDU session anchor of the PDU session. For example, in a multi-PDU session scenario, in a relocation process of PDU session anchor, it is required to establish a new PDU session, release an old PDU session, and release an IP address used in the old PDU session by a terminal.

A network side in the solution in the prior art determines a time at which an IP address is released by using a timer. However, duration set by the timer is determined based on experience and is not precise enough. In this case, if the IP address is released excessively early, a data transmission error may occur. If the IP address is released excessively late, the IP address may be occupied for an excessively long time, thereby causing low utilization of resources.

SUMMARY

The embodiments of this application provide a method, an apparatus, a network device, and a system for releasing an IP address, to resolve a problem that a time at which the IP address is released is not precise.

To achieve the foregoing objective, the embodiments of this application provide the following technical solutions.

According to a first aspect, a method for releasing an IP address is provided, including: determining, by a first network device, that a PDU session anchor needs to be relocated from a first user plane function entity, where the first user plane function entity is a PDU session anchor of a first PDU session of a terminal; determining, by the first network device, that a first IP address of the terminal is no longer used, where the first IP address is an IP address used by the terminal in the first PDU session; and releasing, by the first network device, the first IP address. In the method according to the first aspect, instead of determining a time at which the first IP address is released by using a timer, the first network device releases the first IP address after determining that the first IP address of the terminal is no longer used. Therefore, it is ensured that the first IP address is released in time, thereby ensuring successful data transmission and increasing utilization of resources.

In a possible design, the determining, by the first network device, that a first IP address of the terminal is no longer used includes one of the following cases:

determining, by the terminal, that a connection state of the terminal is an idle state; synchronizing, by the terminal, the connection state of the terminal with a second network device, to enable the second network device to send a first notification to the first network device, where the first notification is used to notify the first network device that the connection state of the terminal is the idle state, so that the first network device determines that the first IP address is no longer used and releases the first IP address, and the first IP address is an IP address used by the terminal in the first PDU session; determining, by the second network device, that the connection state of the terminal is the idle state; sending, by the second network device, the first notification to the first network device, where the first notification includes information that the connection state of the terminal is the idle state; and receiving, by the first network device, the first notification from the second network device;

determining, by a fifth network device, that a connection state of the terminal is an idle state; sending, by the fifth network device, a first notification to the first network device, where the first notification includes information that the connection state of the terminal is the idle state; and receiving, by the first network device, the first notification from the fifth network device, where the first notification is used to notify the first network device that the connection state of the terminal is the idle state;

determining, by the first network device, that a state of the first PDU session is an inactive state;

detecting, by a third network device, activity of the first IP address, where the first IP address is an IP address used by the terminal in the first PDU session; if the first IP address is detected to be inactive, sending, by the third network device, a second notification to the first network device, where the second notification is used to notify the first network device that the first IP address is inactive, so that the first network device determines that the first IP address is no longer used and releases the first IP address; and receiving, by the first network device, the second notification from the third network device;

determining, by a fifth network device, that the first IP address is inactive; sending, by the fifth network device, a second notification to the first network device, where the second notification is used to notify the first network device that the first IP address is inactive, so that the first network device determines that the first IP address is no longer used and releases the first IP address; and receiving, by the first network device, the second notification from the fifth network device; or determining, by a fourth network device or a fifth network device, that an IP connection of the first IP address is released, where the first IP address is an IP address used by the terminal in the first PDU session; sending, by the fourth network device or the fifth network device, a third notification to the first network device, where the third notification is used to notify the first network device that the IP connection of the first IP address is released, so that the first network device determines that the first IP address is no longer used and releases the first IP address, where the third notification includes information that the IP connection of the first IP address is released; and receiving, by the first network device, the third notification from the fourth network device or the fifth network device.

In this possible design, when the connection state of the terminal is the idle state, it is noted that the terminal disconnects all PDU sessions, and in this case, the first IP address of the terminal may be released; when the state of the PDU session is an inactive state, data on all PDU sessions is no longer transmitted, and in this case, the first IP address of the terminal may be released; when the first IP address is inactive, it is noted that the first IP address is not used for a time, and is not likely to be used later, and in this case, the first IP address may be released; and the terminal no longer sends data by using the first IP address after the IP connection of the first IP address is released, and therefore, the first IP address of the terminal may be released.

In a possible design, after the determining, by the first network device, that a PDU session anchor needs to be relocated from a first user plane function entity, the method further includes: selecting, by the first network device, a second user plane function entity as a PDU session anchor of a second PDU session of the terminal; and the determining, by the first network device, that the first IP address of the terminal is no longer used includes: determining, by the terminal or a fifth network device, that the terminal has finished switching from the first IP address to a second IP address; sending, by the terminal or the fifth network device, a fourth notification to the first network device, where the fourth notification is used to notify the first network device that the terminal has finished switching from the first IP address to the second IP address, so that the first network device determines that the first IP address is no longer used and releases the first IP address, where the first IP address is the IP address used by the terminal in the first PDU session, and the PDU session anchor of the first PDU session is the first user plane function entity; and after the PDU session anchor is relocated from the first user plane function entity to a second user plane function entity, the second IP address is an IP address used by the terminal in the second PDU session, and the second user plane function entity is the PDU session anchor of the second PDU session; or after the PDU session anchor of the first PDU session is relocated from the first user plane function entity to the second user plane function entity, the second IP address is the IP address used by the terminal in the first PDU session; and receiving, by the first network device, the fourth notification from the terminal or the fifth network device, where the second IP address is the IP address used by the terminal in the second PDU session. In this possible design, after the second IP address is allocated for the terminal, the terminal needs to gradually transfer a service data flow passing the first user plane function entity to a user plane path including the second user plane function entity, and after the transfer has been finished (that is, switching from the first IP address to the second IP address has been finished), the terminal transmits the service data flow in the user plane path including the second user plane function entity only by using the second IP address, thereby releasing the first IP address of the terminal.

In a possible design, after the determining, by a first network device, that a PDU session anchor needs to be relocated from a first user plane function entity, the method further includes: selecting, by the first network device, a second user plane function entity as a new PDU session anchor of the first PDU session; and the determining, by the first network device, that a first IP address of the terminal is no longer used includes: determining, by the terminal or a fifth network device, that the terminal has finished switching from the first IP address to a second IP address; sending, by the terminal or the fifth network device, a fourth notification to the first network device, where the fourth notification is used to notify the first network device that the terminal has finished switching from the first IP address to the second IP address, so that the first network device determines that the first IP address is no longer used and releases the first IP address, where the first IP address is the IP address used by the terminal in the first PDU session, and the PDU session anchor of the first PDU session is the first user plane function entity; and after the PDU session anchor is relocated from the first user plane function entity to the second user plane function entity, the second IP address is an IP address used by the terminal in a second PDU session, and the second user plane function entity is a PDU session anchor of the second PDU session; or after the PDU session anchor of the first PDU session is located from the first user plane function entity to the second user plane function entity, the second IP address is the IP address used by the terminal in the first PDU session; and receiving, by the first network device, the fourth notification from the terminal or the fifth network device, where when the PDU session anchor of the first PDU session is the second user plane function entity, the second IP address is the IP address used by the terminal in the first PDU session. In this possible design, after the second IP address is allocated for the terminal, the terminal needs to gradually transfer a service data flow passing the first user plane function entity to a user plane path including the second user plane function entity, and after the transfer has been finished (that is, switching from the first IP address to the second IP address has been finished), the terminal transmits the service data flow in the user plane path including the second user plane function entity only by using the second IP address, thereby releasing the first IP address of the terminal.

In a possible design, before the receiving, by the first network device, the second notification from the third network device, the method further includes: sending, by the first network device, a first instruction to the third network device, where the first instruction is used to instruct the third network device to detect activity of the first IP address; and receiving by the third network device, the first instruction from the first network device, where that the third network device detects the activity of the first IP address includes: detecting, by the third network device, the activity of the first IP address according to the first instruction.

In a possible design the determining, by the first network device, that a state of the first PDU session is an inactive state includes: determining, by the fifth network device, that the state of the first PDU session is an inactive state; sending, by the fifth network device, a fifth notification to the first network device, where the fifth notification is used to notify the first network device that the state of the first PDU session is the inactive state; receiving, by the first network device, the fifth notification from the fifth network device; and determining, by the first network device, that the state of the first PDU session is the inactive state based on the fifth notification.

In a possible design, before the releasing, by the first network device, the first IP address, the method further includes: sending, by the first network device, a second instruction to the terminal, where the second instruction is used to instruct the terminal to release the first IP address; receiving, by the terminal, the second instruction from the first network device; and releasing, by the terminal, the first IP address according to the second instruction. In this possible design, after the first network device determines that the first IP address is no longer used, the first network device may send the second instruction to the terminal, and the terminal immediately releases the first IP address after receiving the second instruction, to enable the first network device to release the first IP address.

In a possible, design, before the determining, by the first network device, that a first IP address of the terminal is no longer used, the method further includes: sending, by the first network device, a third instruction, to the terminal, where the third instruction is used to instruct the terminal to release the first IP address when the terminal enters the idle state; and receiving, by the terminal, the third instruction from the first network device. In this possible design, before the first network device determines that the first IP address is no longer used, the first network device may send the third instruction to the terminal, to enable the terminal to release the first IP address when the terminal enters the idle state, so that the first network device releases the first IP address when determining that the terminal is in the idle state.

In a possible design, before the determining, by the first network device, that a first IP address of the terminal is no longer used, the method further includes: marking, by the first network device, the state of the first IP address as to-be-released; and the releasing, by the first network device, the first IP address includes: determining, by the first network device, that the state of the first IP address is to-be-released, and releasing the first IP address. In this possible design, the first network device may receive the third notification carrying a plurality of IP addresses, and in this case, the first network device needs to determine whether the IP addresses in the third notification are IP addresses that need to be released. After the PDU session anchor of the first PDU session is relocated, the first network device may mark the state of the first IP address as to-be-released, so that the first network device may quickly determine that the first IP address is a to-be-released IP address after receiving the third notification of the first IP address.

In a possible design, after the terminal determines that the connection state of the terminal is the idle state, the method further includes: releasing, by the terminal, the first IP address. In this possible design, the terminal releases the first IP address, to enable the first network device to release the first IP address.

According to a second aspect, a first network device is provided, and the first network device is provided with a function that implements an action performed by the first network device in any one of the methods according to the first aspect. The function may be implemented by using hardware, or may be implemented by the hardware executing corresponding software. The hardware or software includes one or more units corresponding to the foregoing function.

According to a third aspect, a terminal is provided, and the terminal is provided with a function that implements an action performed by the terminal in any one of the methods according to the first aspect. The function may be implemented by using hardware, or may be implemented by the hardware executing corresponding software. The hardware or software includes one or more units corresponding to the foregoing function.

According to a fourth aspect, a second network device is provided, and the second network device is provided with a function that implements an action performed by the second network device in any one of the methods according to the first aspect. The function may be implemented by using hardware, or may be implemented by the hardware executing corresponding software. The hardware or software includes one or more units corresponding to the foregoing function.

According to a fifth aspect, a third network device is provided, and the third network device is provided with a function that implements an action performed by the third network device in any one of the methods according to the first aspect. The function may be implemented by using hardware, or may be implemented by the hardware executing corresponding software. The hardware or software includes one or more units corresponding to the foregoing function.

According to a sixth aspect, a fourth network device is provided, and the fourth network device is provided with a function that implements an action performed by the fourth network device in any one of the methods according to the first aspect. The function may be implemented by using hardware, or may be implemented by the hardware executing corresponding software. The hardware or software includes one or more units corresponding to the foregoing function.

According to a seventh aspect, a fifth network device is provided, and the fifth network device is provided with a function that implements an action performed by the fifth network device in any one of the methods according to the first aspect. The function may be implemented by using hardware, or may be implemented by the hardware executing corresponding software. The hardware or software includes one or more units corresponding to the foregoing function.

According to an eighth aspect, a first network device is provided, and the first network device includes: a memory, a processor, and a bus, where the memory is configured to store a computer-executable instruction, the processor and the memory are connected to each other by using the bus, and the processor executes the computer-executable instruction stored in the memory, so that the first network device implements an action performed in any one of the methods according to the first aspect.

According to a ninth aspect, a terminal is provided, and the terminal includes: a memory, a processor, and a bus, where the memory is configured to store a computer-executable instruction, the processor and the memory are connected to each other by using the bus, and the processor executes the computer-executable instruction stored in the memory, so that the terminal implements an action performed in any one of the methods according to the first aspect.

According to a tenth aspect, a second network device is provided, and the second network device includes: a memory, a processor, and a bus, where the memory is configured to store a computer-executable instruction, the processor and the memory are connected to each other by using the bus, and the processor executes the computer-executable instruction stored in the memory, so that the second network device implements an action performed in any one of the methods according to the first aspect.

According to an eleventh aspect, a third network device is provided, and the third network device includes: a memory, a processor, and a bus, where the memory is configured to store a computer-executable instruction, the processor and the memory are connected by using the bus, and the processor executes the computer-executable instruction stored in the memory, so that the third network device implements an action performed in any one of the methods according to the first aspect.

According to a twelfth aspect, a fourth network device is provided, and the fourth network device includes: a memory, a processor, and a bus, where the memory is configured to store a computer-executable instruction, the processor and the memory are connected to each other by using the bus, and the processor executes the computer-executable instruction stored in the memory, so that the fourth network device implements an action performed in any one of the methods according to the first aspect.

According to a thirteenth aspect, a fifth network device is provided, and the fifth network device includes: a memory, a processor, and a bus, where the memory is configured to store a computer-executable instruction, the processor and the memory are connected to each other by using the bus, and the processor executes the computer-executable instruction stored in the memory, so that the fifth network device implements an action performed in any one of the methods according to the first aspect.

According to a fourteenth aspect, a computer-readable storage medium including an instruction is provided. When run on a computer, the instruction enables the computer to execute an action executed by the first network device in any one of the methods according to the first aspect.

According to a fifteenth aspect, a computer-readable storage medium including an instruction is provided. When run on a computer, the instruction enables the computer to execute an action executed by the terminal in any one of the methods according to the first aspect.

According to a sixteenth aspect, a computer-readable storage medium including an instruction is provided. When run on a computer, the instruction enables the computer to execute an action executed by the second network device in any one of the methods according to the first aspect.

According to a seventeenth aspect, a computer-readable storage medium including an instruction, is provided. When run on a computer, the instruction enables the computer to execute an action executed by the third network device in any one of the methods according to the first aspect.

According to an eighteenth aspect, a computer-readable storage medium including an instruction is provided. When run on a computer, the instruction enables the computer to execute an action executed by the fourth network device in any one of the methods according to the first aspect.

According to a nineteenth aspect, a computer-readable storage medium including an instruction is provided. When run on a computer, the instruction enables the computer to execute an action executed by the fifth network device in any one of the methods according to the first aspect.

According to a twentieth aspect, a computer program product including an instruction is provided. When run on a computer, the instruction enables the computer to execute an action executed by the first network device in any one of the methods according to the first aspect.

According to a twenty-first aspect, a computer program product including an instruction is provided. When run on a computer, the instruction enables the computer to execute an action executed by the terminal in any one of the methods according to the first aspect.

According to a twenty-second aspect, a computer program product including an instruction is provided. When run on a computer, the instruction enables the computer to execute an action executed by the second network device in any one of the methods according to the first aspect.

According to a twenty-third aspect, a computer program product including an instruction is provided. When run on a computer, the instruction enables the computer to execute action executed by the third network device in any one of the methods according to the first aspect.

According to a twenty-fourth aspect, a computer program product including an instruction is provided. When run on a computer, the instruction enables the computer to execute an action executed by the fourth network device in any one of the methods according to the first aspect.

According to a twenty-fifth aspect, a computer program product including an instruction is provided. When run on a computer, the instruction enables the computer to execute an action executed by the fifth network device in any one of the methods according to the first aspect.

According to a twenty-sixth aspect, an apparatus is provided, and the apparatus includes a processor, a memory, and a transceiver component, where the transceiver component includes an input/output circuit, the memory is configured to store a computer-executable instruction, and by executing the computer-executable instruction stored in the memory, the processor implements an action executed by the first network device in any one of the methods according to the first aspect.

According to a twenty-seventh aspect, an apparatus is provided, and the apparatus includes a processor, a memory, and a transceiver component, where the transceiver component includes an input/output circuit, the memory is configured to store a computer-executable instruction, and by executing the computer-executable instruction stored in the memory, the processor implements an action executed by the terminal in any one of the methods according to the first aspect.

According to a twenty-eighth aspect, an apparatus is provided, and the apparatus includes a processor, a memory, and a transceiver component, where the transceiver component includes an input/output circuit, the memory is configured to store a computer-executable instruction, and by executing the computer-executable instruction stored in the memory, the processor implements an action executed by the second network device in any one of the methods according to the first aspect.

According to a twenty-ninth aspect, an apparatus is provided, and the apparatus includes a processor, a memory, and a transceiver component, where the transceiver component includes an input/output circuit, the memory is configured to store a computer-executable instruction, and by executing the computer-executable instruction stored in the memory, the processor implements an action executed by the third network device in any one of the methods according to the first aspect.

According to a thirtieth aspect, an apparatus is provided, and the apparatus includes a processor, a memory, and a transceiver component, where the transceiver component includes an input/output circuit, the memory is configured to store a computer-executable instruction, and by executing the computer-executable instruction stored in the memory, the processor implements an action executed by the fourth network device in any one of the methods according to the first aspect.

According to a thirty-first aspect, an apparatus is provided, and the apparatus includes a processor, a memory, and a transceiver component, where the transceiver component includes an input/output circuit, the memory is configured to store a computer-executable instruction, and by executing the computer-executable instruction stored in the memory, the processor implements an action executed by the fifth network device in any one of the methods according to the first aspect.

According to a thirty-second aspect, a communications system is provided, and the communications system at least includes: a first network device and an apparatus, and may further include at least one of a second network device, a third network device, a fourth network device, and a fifth network device, where the first network device may be any one of the first network devices according to the foregoing aspects, the second network device may be any one of the second network devices according to the foregoing aspects, the third network device may be any one of the third network devices according to the foregoing aspects, the fourth network device may be any one of the fourth network devices according to the foregoing aspects, the fifth network device may be any one of the fifth network devices according to the foregoing aspects, the apparatus may be any one of the apparatuses according to the foregoing aspects, and the apparatus may be a terminal.

Compared with the prior art, in the solution according to the embodiments of this application, after determining that the first IP address of the terminal is no longer used, the first network device can release the first IP address without using a timer to determine a time at which the first IP address is released. Therefore, it is ensured that the first IP address is released in time, thereby ensuring precise data transmission and increasing utilization of resources.

DESCRIPTION OF EMBODIMENTS

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: only A exists, both A and B exist, and only B exists. In addition, in the description of this application, "a plurality of" means two or more than two.

To help understand the embodiments of this application, the following briefly describes concepts related to this application.

PDU Session

A PDU session is a connection between a terminal and a DN, and is configured to provide a PDU connectivity service. The PDU connectivity service, which is supported by a core network of the fifth-generation (5G) communications system, refers to a service of performing a PDU exchange between a terminal and a DN that is determined by a data network name (DNN). The terminal may be connected to a same DN or different DNs by using a plurality of PDU sessions, and the terminal may further be connected to a same DN by using one or more PDU sessions served by different PDU session anchors. Based on types of transmitted data, types of PDU sessions may be divided into an IP type, an Ethernet type, or an unstructured data type. In the methods according to the embodiments of this application, a type of a PDU session may be an IP type.

A PDU session is accessed to a DN by using a PDU session anchor, and the PDU session anchor may be a user plane function (UPF) entity connected to the DN. Therefore, a PDU session anchor may be referred to as a PDU session anchor UPF, and in this specification, the methods according to the embodiments of this application is described by using an example, in which a PDU session anchor is a UPF. One PDU session can only be accessed to a DN by using one PDU session anchor. In this case, if the terminal wants to be accessed to the DN by using a plurality of PDU session anchors, a plurality of PDU sessions needs to be established. This manner with a plurality of PDU session anchors accessed to a DN is referred to as a multi-PDU session (multi-PDU session). One PDU session may further be accessed into a DN by using a plurality of PDU session anchors. In this case, based on different processing modes, the manners may be divided into a multi-homed PDU session (multi-homed PDU session) and an uplink classification PDU session.

(1) Multi-PDU Session

In a multi-PDU session, the terminal may be accessed to a same DN by using different PDU session anchors. Connections corresponding to different PDU session anchors belong to different PDU sessions.

Figure 2:
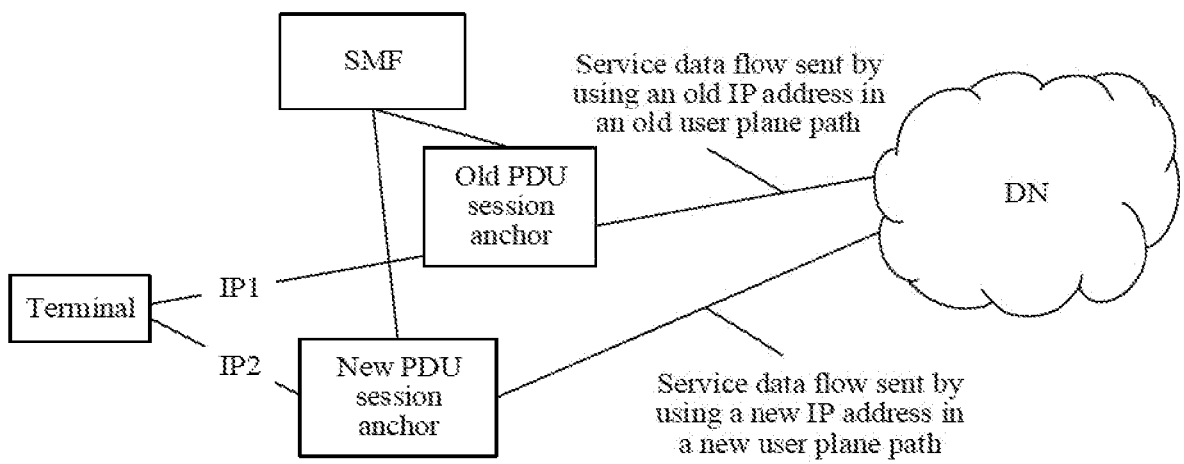
FIG. 2 is a schematic diagram of a service data flow in a relocation process of a PDU session anchor in a multi-PDU session scenario according to an embodiment of this application.

FIG. 2 is a schematic diagram of a multi-PDU session scenario. As shown in FIG. 2, a terminal is accessed to a DN by using an old PDU session anchor, and in this case, an IP address (IP1) has been allocated for the terminal. When the PDU session anchor needs to be relocated, an SMF (session management function) selects a new PDU session anchor, establishes a new PDU session, and allocates a new IP address (IP2) for the terminal. By using the new PDU session anchor, the terminal is accessed to the DN in the new IP address. In this case, an old PDU session and a new PDU session belong to different PDU sessions. A service data flow passing the old PDU session anchor, by using an old IP address, is a service data flow that is sent in an old user plane path. A service data flow passing the new PDU session anchor, by using a new IP address, is a service data flow that is sent in a new user plane path.

(2) Multi-Homed PDU Session

Figure 3:
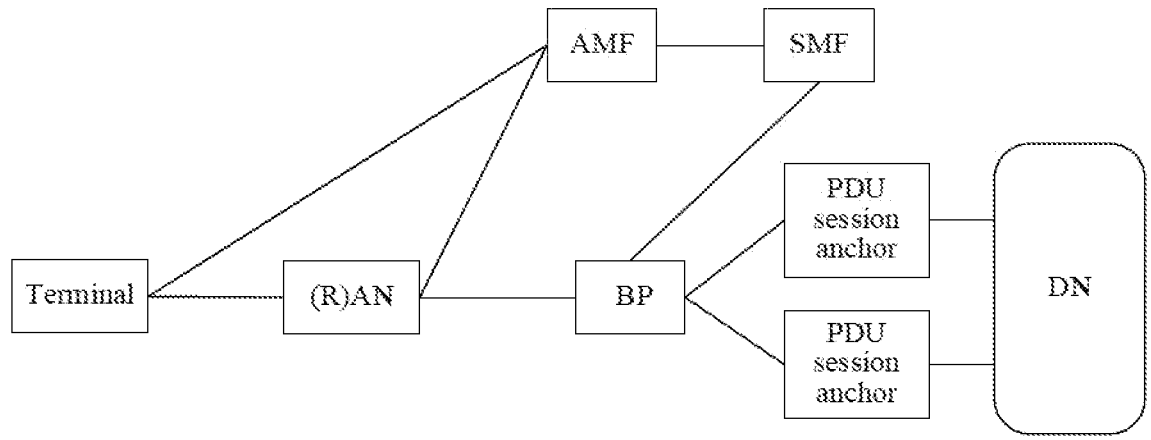
FIG. 3 is a schematic architectural diagram of a network element of relocation of a PDU session anchor in a multi-homed PDU session scenario according to an embodiment of this application.

In a multi-homed PDU session scenario, one PDU session may be relevant to a plurality of Internet protocol version 6 (IPv6) prefixes. In this case, referring to FIG. 3, when an SSC (session and service continuity) pattern related to a PDU session anchor is a pattern 3, in a relocation process of the PDU session anchor of the multi-homed PDU session, a PDU session is accessed to a DN by using a plurality of PDU session anchors (for example, a PDU session anchor 1 and a PDU session anchor 2). A user plane path to different PDU session anchors branches on a normal UPF, which is referred to as a "branching point (branching point, BP)". The BP sends uplink data to different PDU session anchors, and fuses downlink data to a terminal, for example, fuses data that is connected to the different PDU session anchors of the terminal. The terminal may exchange information with "BP" by using an access network (AN), for example, a radio access network (RAN).

Figure 4:
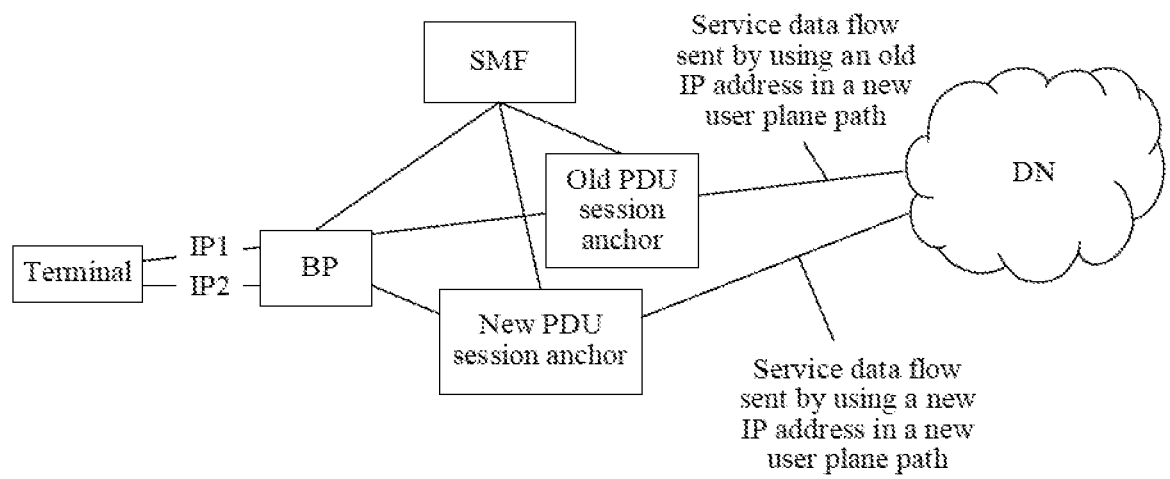
FIG. 4 is a schematic diagram of a service data flow in a relocation process of a PDU session anchor in a multi-homed PDU session scenario according to an embodiment of this application.

FIG. 4 is a schematic diagram of a service data flow in the relocation process of the PDU session anchor of the multi-homed PDU session when the SSC pattern related to the PDU session anchor is the pattern 3. As shown in FIG. 4, the terminal is accessed to the DN by using an old PDU session anchor, and in this case, an IP address (IP1) has been allocated for the terminal. When the PDU session anchor needs to be relocated, an SMF enables a PDU session to use a new PDU session anchor by: inserting a BP, where the BP may be inserted in an existing UPF, or the BP may be inserted in a newly selected UPF; selecting the new PDU session anchor connected to the BP; updating session context, and configuring a new IP address (IP2). By using the new PDU session anchor, the terminal is accessed to the DN in the new IP address. Due to the insertion of the BP, a user plane path including the old PDU session anchor and a user plane path including the new PDU session anchor both are new user plane paths, so that a service data flow passing the old PDU session anchor is a service data flow that is sent by using an old IP address and in the new user plane path, and a service data flow passing the new PDU session anchor is a service data flow that is sent by using the new IP address and in the new user plane path. In this case, the terminal is connected to the DN by using a PDU session.

(3) Uplink Classification PDU Session

Figure 5:
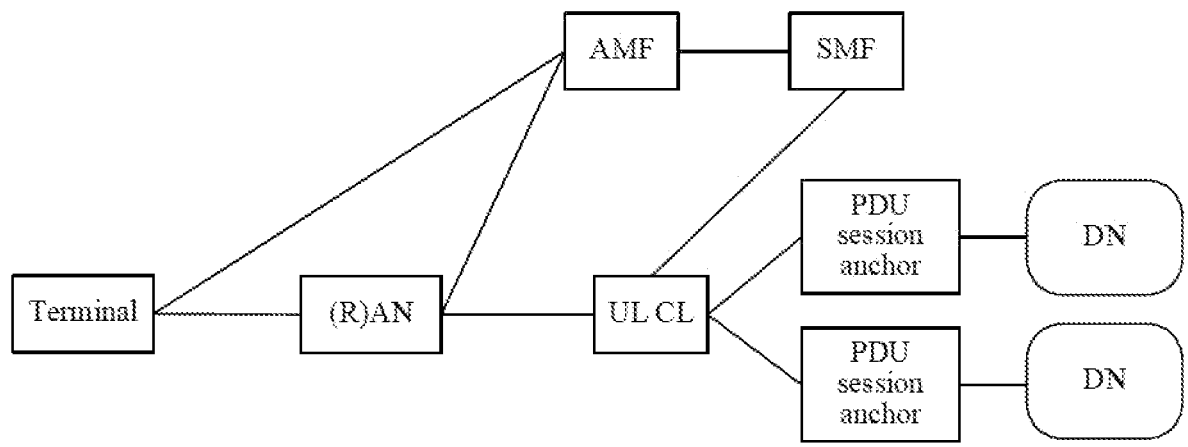
FIG. 5 is a schematic architectural diagram of a network element of relocation of a PDU session anchor in a CL PDU session scenario according to an embodiment of this application.

When types of PDU sessions are an IPv4 type, an IPv6 type, or an Ethernet type, an "uplink classifier (UL CL)" may be included on a user plane path of a PDU session. Therefore, the uplink classification PDU session may also be referred to as a UL CL PDU session. Referring to FIG. 5, the UL CL may be inserted in a UPF to split data that matches with a transmission filter provided by an SMF.

Figure 6:
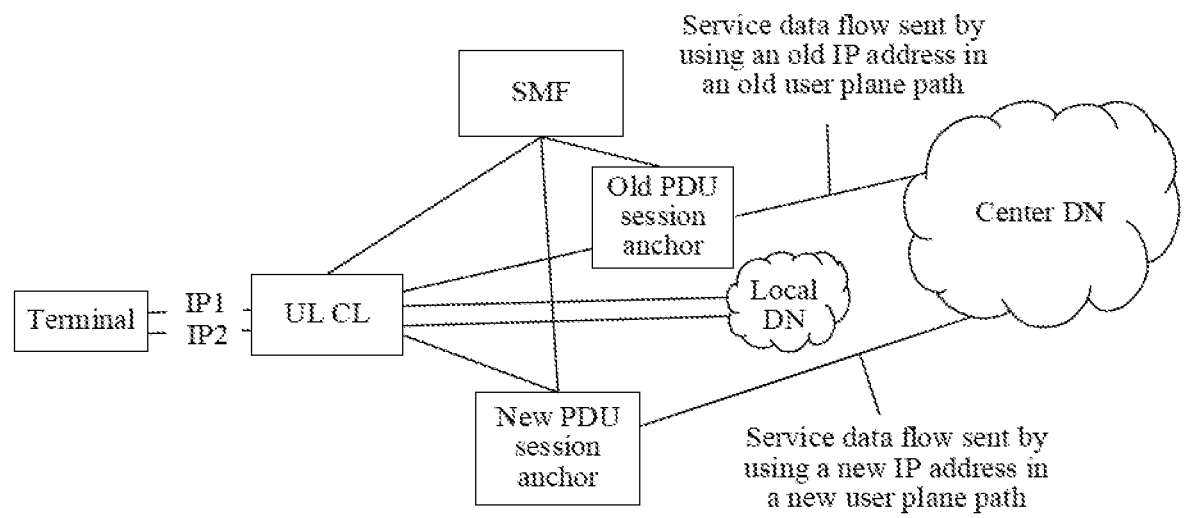
FIG. 6 is a schematic diagram of a service data flow in a relocation process of a PDU session anchor in a UL CL PDU session scenario according to an embodiment of this application.

FIG. 6 is a schematic diagram of a data flow in a relocation process of a PDU session anchor of a UL CL PDU session when an SSC pattern related to the PDU session anchor is a pattern 3. As shown in FIG. 6, a terminal is connected to a center DN by using an old PDU session anchor, and in this case, an IP address (IP1) has been allocated to the terminal. When the PDU session anchor needs to be relocated, an SMF enables a PDU session to use a new PDU session anchor by: selecting a new PDU session anchor connected to the UL CL, updating session context; and configuring a new IP address (IP2). The terminal is accessed to a center DN by using the new PDU session anchor and in the new IP address. In addition, referring to FIG. 6, UL CL may split data to the center DN by using different PDU session anchors.

A service data flow passing the old PDU session anchor, by using the old IP address, is a service data flow that is sent in an old user plane path. A service data flow passing the new PDU session anchor, by using the new IP address, is a service data flow that is sent in a new user plane path. In this case, the terminal is connected to the DN by using a PDU session.

SSC Pattern

An SSC pattern of a system architecture of the 5G network can meet requirements of continuity of a plurality of different applications and services of a terminal. The SSC pattern related to a PDU session anchor does not change in a lifecycle of a PDU session. An SMF determining the SSC pattern related to the PDU session anchor may be achieved by receiving an SSC pattern in a request of the terminal, or may be achieved by subscription or local configuration to modify the SSC pattern in the request of the terminal. The SSC pattern related to the PDU session anchor includes a pattern 1, a pattern 2, or a pattern 3.

For a PDU session of the SSC pattern 1, when the PDU session is established, a PDU session anchor remains unchanged. For a PDU session of an IP type, IP continuity is supported constantly, and the IP address does not change for a mobile event of the terminal.

For a PDU session of the SSC pattern 2, a network may trigger release of the PDU session, and instruct the terminal to immediately establish a new PDU session to a same DN. After the release of the PDU session, the SMF may select a new PDU session anchor for the newly established PDU session.

For a PDU session of the SSC pattern 3, the network allows the terminal to establish a connection to the same DN by using a new PDU session anchor before the release of the old PDU session anchor. When a trigger condition is satisfied the SMF decides whether to select a PDU session anchor suitable for a new situation of the terminal.

The SSC pattern 3 may be applied to any type of a PDU session. In the SSC pattern 3, to ensure service continuity and a consistent user service experience, after a new IP address is allocated, an old IP address is maintained for a time, and then is released.

In the embodiments of this application, an IP address may be an Internet protocol version 4 (IPv4) address or an IPv6 prefix, where the IPv6 prefix may be represented as an IP prefix, which functions as an IP address in the IPv4.

IP Address Management

In the methods according to the embodiments of this application, a PDU session is of an IP type, an IP version is the IPv4 or the IPv6, and an SMF allocates an IP address to a terminal based on a selected IP version.

For a PDU session of an IPv4 type, a core network may allocate an IP address for the terminal. In a process of establishing the PDU session, the SMF sends the IP address and an IPv4 configuration parameter to the terminal through a session management non-access stratum (SM NAS) signaling. If dynamic host configuration protocol version 4

(DHCPv4) is applied, the SMF sends the IP address and the IPv4 configuration parameter to the terminal by using the DHCPv4. Therefore, the SMF configures a UPF as a PDU session anchor to send all DHCPv4 information between the terminal and the SMF.

For a. PDU session of the IPv6 type, the core network configures the IPv6 prefix to the terminal by using stateless address autoconfiguration (SLAAC). By using a stateless dynamic host configuration protocol version 6 (DHCPv6), the SMF sends router advertisement information and an IPv6 configuration parameter to the terminal through a PDU session anchor. Therefore, the SMF configures a UPF as the PDU session anchor to send all router solicitation (RS)/router advertisements (RA) and DHCPv6 information between the terminal and the SMF. After receiving an PA message, the terminal constructs a complete IPv6 address by using the IPv6 SLAAC.

Figure 1:
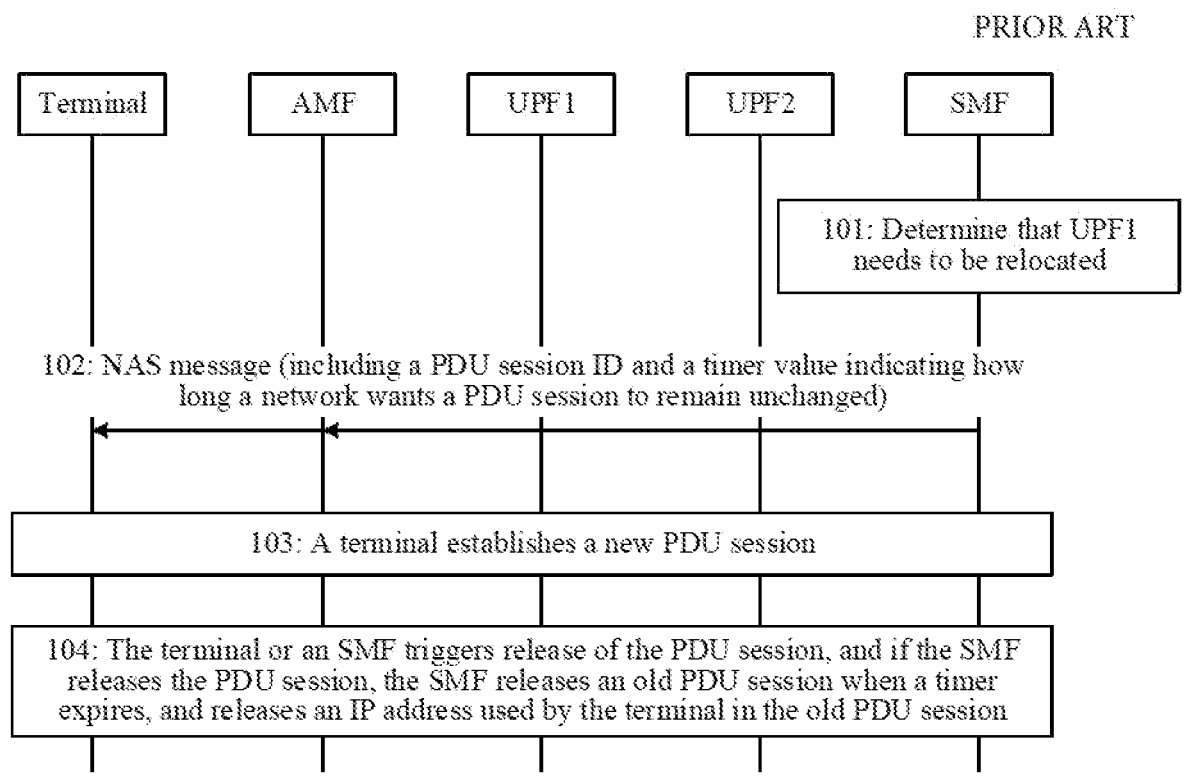
FIG. 1 is a schematic diagram of communication in a relocation process of a PDU session anchor of a multi-PDU session.

In the solution in the prior art, a relocation process of a PDU session anchor of a multi-PDU session may refer to FIG. 1, specifically including the following steps. 101. A session management function (SMF) entity determines that a PDU session anchor (that is, UPF1) serving currently needs to be relocated. 102. The SMF entity sends a non-access stratum (NAS) message to a terminal by using a core access and mobility management function (AMF) entity, where the NAS message is used to notify the terminal that a current PDU session are to be released, and is further used to notify the terminal to re-establish a PDU session; and the NAS message may include a PDU session identifier (ID), where the terminal determines the to-be-released PDU session based on the PDU session ID, and the NAS message may further include a timer value that indicates how long a network wants the PDU session to remain unchanged, so that the terminal transfers a service data flow before the timer expires. 103. The terminal establishes a new PDU session, where a PDU session anchor of the new PDU session is UPF2. 104. The terminal or the SMF triggers release of the PDU session, and if the SMF releases the PDU session, the SMF releases an old PDU session when the timer expires, and releases an IP address used by the terminal in the old PDU session.

In the foregoing processes, the SMF determines a time at which the IP address is released by using the timer. However, duration set by the timer is determined based on experience and is not precise enough. In this case, if the IP address is released excessively early, the old PDU session at a terminal side may not be released, and a data transmission error may occur. If the IP address is released excessively late, the IP address may be occupied for an excessively long time, and utilization of resources is decreased.

In view of this, the embodiments of this application provide a method for releasing an IP address, so that a network device can release an IP address of a terminal at an appropriate time. The method according to the embodiments of this application may be applied to a scenario, in which a PDU session anchor is relocated, in an SSC pattern 3. For example, the scenario may be a multi-PDU session scenario, a multi-homed PDU session scenario, or a CL PDU session scenario.

Figure 7:
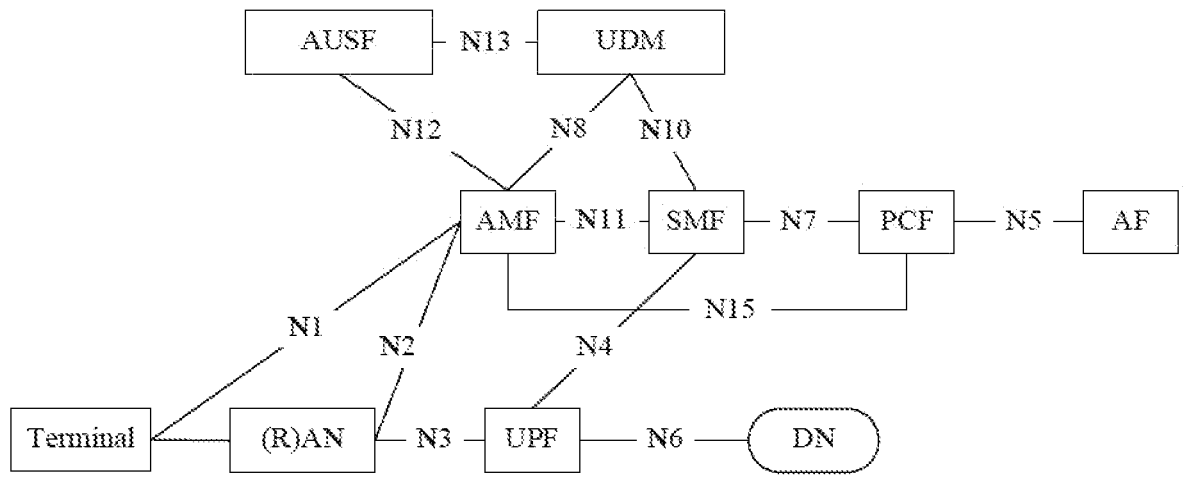
FIG. 7 is a schematic diagram of a possible network architecture according to an embodiment of this application.

The method according to the embodiments of this application may be applied to a 5G network shown in FIG. 7. As shown in FIG. 7, the 5G network may include a plurality of network function (NF) entities as follows: an authentication server function (AUSF) entity, an AMF entity, a DN, a unified data management (UDM) entity, a policy control function (PCF) entity, an (R) AN device, a UPF entity, a terminal, an application function (AF) entity, and an SMF entity. It may be understood that, FIG. 7 is merely a diagram of an example of an architecture. In addition to the function entities shown in FIG. 7, the 5G network architecture may further include other function entities, for example, between the AF entity and the PCF entity, a network exposure function (NEF) entity may be included, and a management and orchestration (MAINE) network element and/or a mobile edge orchestrator (MEO) network element may further be included. The MANO and the MEO are network elements that are required in deployment and implementation and that have a network management function.

The terminal communicates with the AMF entity through a next generation (next generation) network interface 1 (N1 for short), the (R)AN device communicates with the AMF entity through an N interface 2 (N2 for short), the (R)AN device communicates with the UPF entity through an N interface 3 (N3 for short), the UPF entity communicates with the DN through an N interface 6 (N6 for short), the AMF entity communicates with the SMF entity through an N interface 11 (N11 for short), the AMF entity communicates with the UDM entity through an N interface 8 (N8 for short), the AMF entity communicates with the AUSF entity through an N interface 12 (N12 for short), the AMF entity communicates with the PCF entity through an N interface 15 (N15 for short), the SMF entity communicates with the PCF entity through an N interface 7 (N7 for short), the SMF entity communicates with the UPF entity through an N interface 4 (N4 for short), the SMF entity communicates with the UDM entity through an N interface 10 (N10 for short), the UDM entity communicates with the AUSF entity through an N interface 13 (N13 for short), and the PCF entity communicates with the AF entity through an N interface 5 (N5 for short).

In addition, the UDM entity, the AUSF entity, the PCF entity, the AMF entity, and the SMF entity in FIG. 7 may be collectively referred to as control, plane (control plane, CP) function entities. This is not limited by the embodiments of this application.

Specifically, a main function of the (R)AN device includes: providing a wireless connection; a main function of the UPF entity includes: routing and forwarding of a data packet (for example, an uplink classifier is supported in routing a service flow to a DN) support a BP, thereby supporting a multi-homed PDU session, an anchor point for mobility, or the like; the DN may be a service of an operator, an Internet access service, or a third party service; main functions of the AMF entity include managing user registration, accessibility testing, selection of an SMF node, mobile state transition management, and the like; main functions of the SMF entity include: controlling establishment of a session, modifying and deleting, selection of a user node, and the like; main functions of the PCF entity include: determining a strategy, providing a rule of detection based on a service data flow and an application, a gating rule, a rule of quality of service (QoS), a rule of charging control based on a flow, and the like rules; main functions of the AF entity include: interacting with a 3rd generation partnership project (3GPP) core network to provide a service, to affect a service flow route, access network capability exposure, policy control, and the like; a main function of the AUSF entity includes: providing an authentication service; a main function of the UDM entity includes: storing user subscription data; the NEF entity is configured to securely expose a service and capability provided by a 3GPP network function, for example, a third party, edge computing, an AF, and the like.

The terminal in the embodiments of this application may also be referred to as user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal may further be a station (ST) in a wireless local area network (WLAN), a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, or a wearable device (may also be referred to as a wearable intelligent device). The terminal may further be a terminal device in a next-generation communications system, for example, a terminal device in 5G, a terminal device in a future evolved public land mobile network (public land mobile network, PLMN), a terminal device in a new radio (NR) communications system, or the like.

Figure 8:
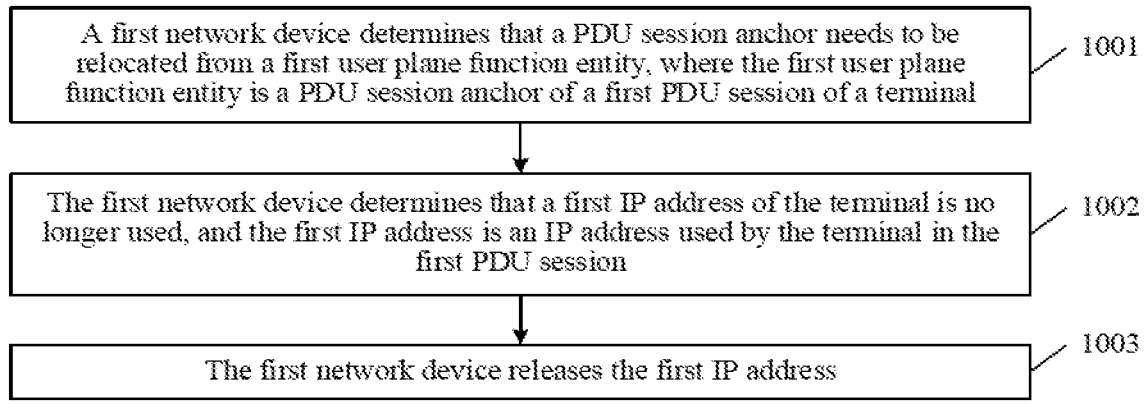
FIG. 8 is a flowchart of a method for releasing an IP address according to an embodiment of this application.

The embodiments of this application provide a method for releasing an IP address, and as shown in FIG. 8, the method includes the following steps.

1001. A first network device determines that a PDU session anchor needs to be relocated from a first user plane function entity, where the first user plane function entity is a PDU session anchor of a first PDU session of a terminal.

The terminal may include one or more PDU sessions, and when the terminal includes a plurality of PDU sessions, the first PDU session may be any one of the plurality of the PDU sessions.

Specifically, in a case in which the terminal moves out of coverage of the first user plane function entity, a load of the first user plane function entity is relatively large, or the terminal is relatively far away from the first user plane function entity, an SMF may determine that the PDU session anchor needs to be relocated from the fast user plane function entity, or further determine that the PDU session anchor needs to be relocated from the first user plane function entity in another case, which is not described herein.

For example, based on examples in FIG. 2, FIG. 4, and FIG. 6, the first user plane function entity may be an old PDU session anchor, and a first IP address may be IP1.

1002. The first network device determines that the first IP address of the terminal is no longer used, the first IP address is an IP address used by the terminal in the first PDU session.

Optionally, when specifically implemented, step 1002 may be implemented by using any one of the following five implementation manners.

Manner 1. The first network device receives a first notification from a second network device or a fifth network device, where the fast notification is used to notify the first network device that a connection state of the terminal is an idle state.

For example, the first notification may be an idle notification. The first network device may determine that the connection state of the terminal is the idle state by receiving the first notification, and the first notification includes information that the connection state of the terminal is the idle state.

The connection state of the terminal may be the idle state or a connected state. It should be noted that once the connection state of the terminal is the idle state the terminal disconnects all PDU sessions, and in this case, the first IP address of the terminal may be released. For example, the second network device may be an AMF.

Optionally, before the first network device receives the first notification from the second network device, the method may further include: determining, by the second network device, that the connection state of the terminal is the idle state; and sending, by the second network device, the first notification to the first network device, where the first notification includes information that the connection state of the terminal is the idle state.

Optionally, after the terminal determines that the connection state of the terminal is the idle state, the terminal may synchronize the connection state of the terminal with the second network device, to enable the second network device to, send the first notification to the first network device. Specifically, the terminal may synchronize the connection state of the terminal with the AMF, and when the connection state of the terminal is the idle state, the AMF may send the first notification to the first network device.

Manner 2. The first network device determines that a state of the first PDU session is an inactive state.

It may be understood that the state of the PDU session may include the inactive state or an active state. When the state of the PDU session is the inactive state, data on all PDU sessions is no longer transmitted, and in this case, the first IP address of the terminal may be released.

Optionally, the determining, by the first network device, that the state of the first PDU session is the inactive state may include: receiving, by the first network device, a fifth notification sent by a fifth network device, where the fifth notification is used to notify the first network device that the state of the first PDU session is the inactive state; and determining, by the first network device, that the state of the first PDU session is the inactive state based on the fifth notification. Certainly, the first network device may also determine that the state of the first PDU session is the inactive state independently.

For example, the fifth notification may be an inactive state notification, where the inactive state notification includes information that the state of the first PDU session is the inactive state.

Manner 3. The first network device receives a second notification from a third network device or a fifth network device, where the second notification is used to notify the first network device that the first IP address is inactive.

For example, the second notification may be an IP address inactive report of the IP address.

The first IP address being inactive may indicate that the first IP address is not used for more than a first time period. The first time period may be configured by a network, or may further be determined by using another manner. For example, the first time period may be 3 milliseconds (ms) or 5 ms.

When the PDU session is a multi-PDU session, the third network device may be the first user plane function entity, when the PDU session is a multi-homed PDU session, the third network device may be a BP and when the PDU session is CL PDU session, the third network device may be a UL CL.

Optionally, before the first network device receives the second notification from the third network device, the method may further include: detecting, by the third network device, activity of the first address; if the first IP address is detected to be inactive, sending, by the third network device, the second ratification to the first network device.

Optionally, before the third network device detects activity of the first IP address, the method may further include: sending, by the first network device, a first instruction to the third network device, where the first instruction is used to instruct the third network device to detect the activity of the first IP address; receiving, by the third network device, the first instruction from the first network device; and in this case, the detecting, by the third network device, the activity of the first IP address may include: detecting, by the third network device, the activity of the first IP address according to the first instruction.

For example, the first instruction may be an instruction sent by the first network device to the third network device after the first network device determines that the PDU session anchor needs to be relocated from the first user plane function entity.

Manner 4. The first network device receives a third notification from a fourth network device or a fifth network device, where the third notification is used to notify the first network device that an IP connection of the first IP address is released.

For example, the third notification may be an IP connection release report of the first IP address.

For example, the IP connection of the first IP address being, released indicates that in a second time period, all application programs in the terminal do not use the first IP address to send data, or the IP connection of the first IP address is released. The second time period may be configured by a network, or may fluffier be determined by using another manner. For example, the second time period may be 2 ms or 3 ms.

The fourth network device may be a MANO or an AF. The AF may sense a message of an application layer. When all the application programs in the terminal, in the second time period, do not use the first IP address to send the data, the AF sends the third notification to the first network device. In addition, there may be an IP connection (for example, a transmission control protocol (TCP) connection) of the first IP address between an application program and the terminal. The AF can immediately sense it when the IP connection is released, and in this case, the AF may also send the third notification to the first network device.

Optionally, before the first network device receives the third notification sent by the fourth network device, the method may further include: determining, by the fourth network device, that the IP connection of the first IP address is released; and sending, by the fourth network device, the third notification to the first network device.

Manner 5. When the PDU session is a multi-PDU session, after step 1001, the method may further include: selecting, by the first network device, a second user plane function entity as a PDU session anchor of a second PDU session of the terminal; and in this case, step 1002 may include: receiving, by the first network device, a fourth notification from the terminal or a fifth network device, where the fourth notification is used to notify the first network device that the terminal has finished switching from the first IP address to a second IP address, and the second IP address is an IP address used by the terminal in the second PDU session.

When the PDU session is a multi-homed PDU session or a UL CL PDU session, after step 1001, the method may further include: selecting, by the first network device, the second user plane function entity as a new PDU session anchor of the first PDU session; and in this case, step 1002 may include: receiving, by the first network device, the fourth notification from the terminal or the fifth network device, where the fourth notification is used to notify the first network device that the terminal has finished switching from the first IP address to the second IP address, and when the PDU session anchor of the first PDU session is the second user plane function entity, the second IP address is the IP address used by the terminal in the first PDU session.

For example, based on examples in FIG. 2, FIG. 4, and FIG. 6, the second user plane function entity may be a new PDU session anchor, and the second IP address may be IP2.

Optionally, before the first network device receives the fourth notification from the terminal, the method may further include:

determining, by the terminal, that switching from the first IP address to the second IP address has been finished; and sending, by the terminal, the fourth notification to the first network device.

It should be noted that after the second IP address is allocated for the terminal, the terminal needs to gradually transfer a service data flow passing the first user plane function entity to a user plane path including the second user plane function entity, and after the transfer has been finished (that is, switching from the first IP address to the second IP address has been finished), the terminal transmits the service data flow in the user plane path including the second user plane function entity only by using the second IP address. After the terminal has finished switching from the first IP address to the second IP address, the first network device releases the first IP address and deletes the first user plane function entity, and relocation of the PDU session anchor is finished, that is, after the relocation of the PDU session anchor is finished, there is only one user plane path in the PDU session. For example, referring to FIG. 2, FIG. 4, and FIG. 6, after the relocation of the PDU session anchor is finished, the user plane path is a user plane path including the new PDU session anchor.

1003. The first network device releases the first IP address.

Optionally, before step 1003, the method may further include: sending, by the first network device, a second instruction to the terminal, where the second instruction is used to instruct the terminal to release the first IP address; and receiving, by the terminal, the second instruction from the first network device, and the terminal releases the first IP address according to the second instruction.

After the first network device determines that the first IP address is no longer used, the first network device may send the second instruction to the terminal, and after receiving the second instruction, the terminal immediately releases the first IP address, to enable the first network device to release the first IP address.

Optionally, before step 1003, the method may further include: sending, by the first network device, a third instruction to the terminal, where the third instruction is used to instruct the terminal to release the first IP address when the terminal enters the idle state; receiving, by the terminal, the third instruction from the first network device; and releasing, by the terminal, the first IP address when the connection state of the terminal is the idle state.

Before the first network device determines that the first IP address is no longer used, the first network device may send the third instruction to the terminal, to enable the terminal to release the first IP address when the terminal enters the idle state, so that the first network device releases the first IP address when determining that the terminal is in the idle state.

Optionally, before step 1003, the method may further include: marking, by the first network device, a state of the first IP address as to-be-released; and in this case, when specifically implemented, step 1002 may include: determining, by the first network device, that the state of the first IP address is to-be-released, and releasing the first IP address.

The first network device may receive a plurality of third notifications, and in this case, the first network device needs to determine whether IP addresses in the third notifications are IP addresses that need to be released. After determining that the PDU session anchor in the first PDU session needs to be relocated from the first user plane function entity, the first network device may mark the state of the first IP address as to-be-released, to enable the first network device to quickly determine that the first IP address is an IP address that needs to be released after the network device receives the third notifications.

The first user plane function entity and the second user plane function entity in the foregoing embodiment both are controlled by a same SMF. In the multi-homed PDU session or the UL CL PDU session scenario, there is also a following case, that is, after the PDF session author is relocated, a second SMF serves the terminal, a first SMF cannot directly exchange information with the terminal, the first SMF is an SMF that controls the first user plane function entity, and the second SMF is an SMF that controls the second user plane function entity. In this case, the first network device is the first SMF, and the fifth network device may be the second SMF. The first notification obtained by the fifth network device may be sent by the second network device, and the method for determining the first notification by the second network device may refer to the foregoing description; the second notification obtained by the fifth network device may be sent by the third network device, and the method for determining the second notification by the third network device may refer to the foregoing description; the fourth notification obtained by the fifth network device may be sent by the terminal, and the method for determining the fourth notification by the terminal may refer to the foregoing description; the third notification obtained by the fifth network device may be sent by the fourth network device, and the method for determining the third notification by the fourth network device may refer to the foregoing description; and the fifth network device may independently determine that the state of the first PDU session is the inactive state.

In the method according to the embodiments of this application, instead of determining a time at which the first IP address is released by using a timer value, the first network device releases the first IP address after determining that the first IP address of the terminal is no longer used. Therefore, it is ensured that the first IP address is released in time, thereby ensuring precise data transmission and increasing utilization of resources.

The following illustratively describes each of the solutions in the foregoing method by using a plurality of embodiments and from the perspective of interaction between network elements. It should be noted that for ease of description, same or similar content may make reference to each other in each of the following embodiments.

Embodiment 1

Figure 9:
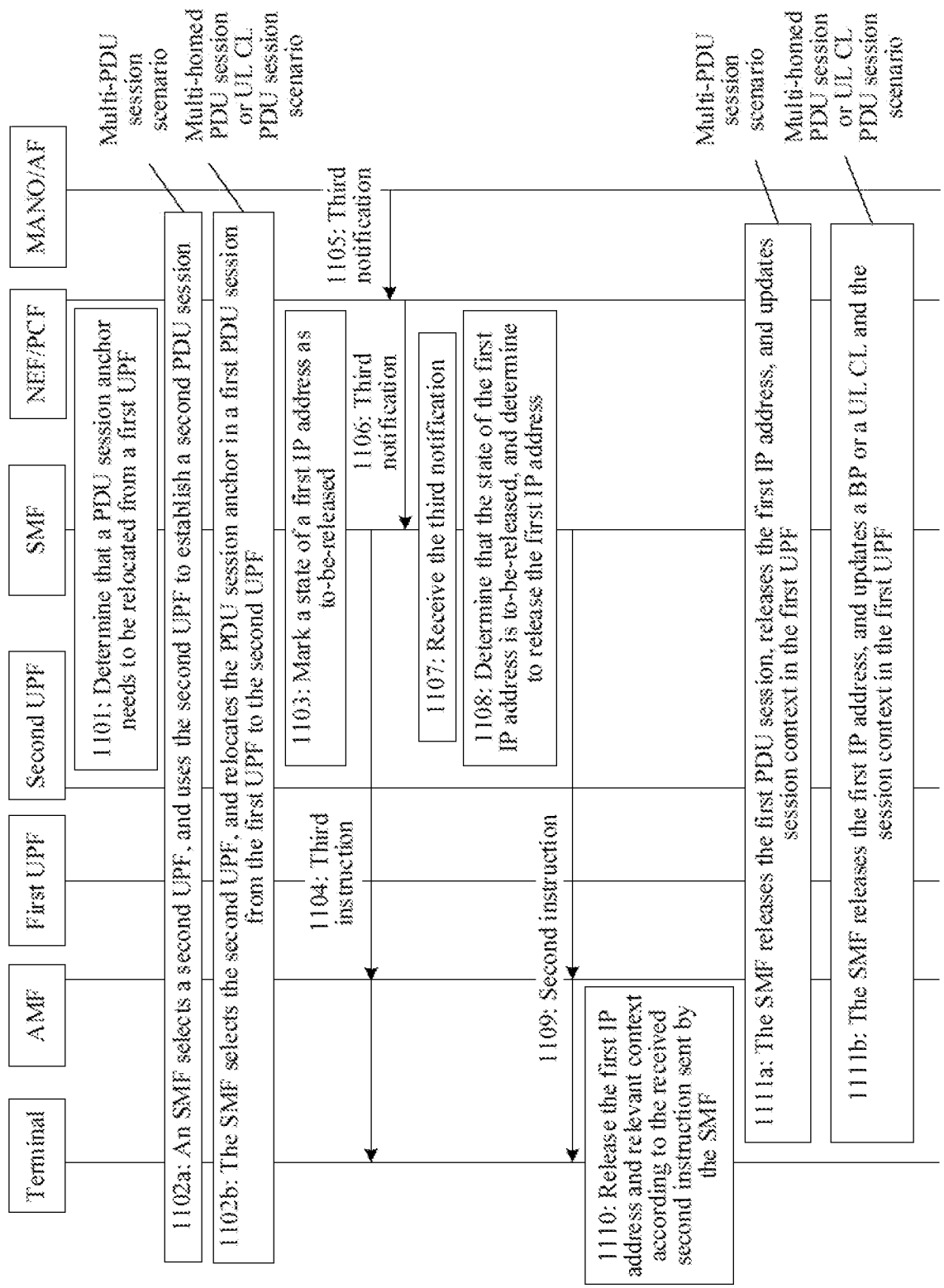
FIG. 9 is a schematic diagram of communication of a method for releasing an IP address according to an embodiment of this application.

Embodiment 1 provides a method for releasing, an IP address, and as shown in FIG. 9, the method may include:

1101. An SMF determines that a PDU session anchor needs to be relocated from a first UPF.

Before step 1101, there has been a first PDU session, and the terminal uses a first IP address to transmit a service data flow in the first PDU session.

Specifically, in a case in which the terminal moves out of coverage of the first UPF, a load of the first UPF is relatively lame, or the terminal is relatively far away from the first UPF, the SMF may determine that the PDU session anchor needs to be relocated from the first UPF, or further determine that the PDU session anchor needs to be relocated from the first UPF in another case, which is not described herein.

The following step 1102*a* and step 1102*b* are optional steps, and one is chosen to perform. For example, when an application scenario of the method is a multi-PDU session scenario, step 1102*a* is performed, or when the application scenario of the method is a multi-homed PDU session or a UL CL PDU session scenario, step 1102*b* is performed.

1102*a*. The SMF selects a second UPF, and uses the second UPF to establish a second PDU session.

In a process of establishing the second PDU session, the SMF allocates a second IP address for the terminal. It should be noted that an IP address range and a method for allocating the IP address of the SMF may, based on a plurality of UPFs, be configured in advance.

1102*b*. The SMF selects the second UPF, and relocates the PDU session anchor in the first PDU session from the first UPF to the second UPF.

The second UPF may be selected by the SMF, and the SMF, specifically based on the load of the UPF, a network load, or a distance from the terminal to the UPF, may preferably select a second UPF among the plurality of the UPFs.

In a process of performing step 1102*b*, the SMF allocates the second IP address for the terminal, selects a new BP or UL CL, and updates session context to support a channel to the second UPF. It should be noted that an IP address range and a method for allocating the IP address of the SMF may, based on a plurality of UPFs, be configured in advance.

After step 1102*a* or 1102*b*, the terminal gradually transfers a service data flow passing the first UPF to a user plane path including the second UPF.

1103. The SMF marks a state of the first IP address as to-be-released.

1104. The SMF sends a third instruction to the terminal.

The third instruction is used to instruct the terminal to release the first IP address when the terminal enters an idle state, and the third instruction may be included in a NAS message. Specifically, the SMF may first send the third instruction to an AMF, and the AMF forwards the third instruction to the terminal.

Any two steps of step 1102*a*, step 1103, and step 1104 can be performed in a random sequence; or any two steps of step 1102*b*, step 1103, and step 1104 can be performed in a random sequence.

1105. An NEF/PCF receives a third notification sent by a MANO/AF.

Optionally, the MANO may be replaced with a MEO.

1106. The NEF/PCF sends the third notification to the SME.

1107. The SMF receives the third notification sent by the NEF/PCF.

1108. The SMF determines that the state of the first IP address is to-be-released, and determines to release the first IP address.

1109. The SMF sends a second instruction to the terminal.

The second instruction is used to instruct the terminal to release the first IP address, and the second instruction may be included in the NAS message. Specifically, the SMF may first send the second instruction to the AMF, and the AMF forwards the second instruction to the terminal.

1110. The terminal releases the first IP address and relevant context according to the received second instruction sent by the SMF.

After step 1110, when the application scenario of the method is the multi-PDU session scenario, step 1111*a* is performed; and when the application scenario of the method is the multi-homed PDU session or the UL CL PDU session scenario, step 1111*b* is performed.

1111*a*. The SMF releases the first PDU session, releases the first IP address and updates the session context in the first UPF.

1111*b*. The SMF releases the first IP address, and updates the BP or the UL CL and the session context in the first UPF Embodiment 2

Figure 10:
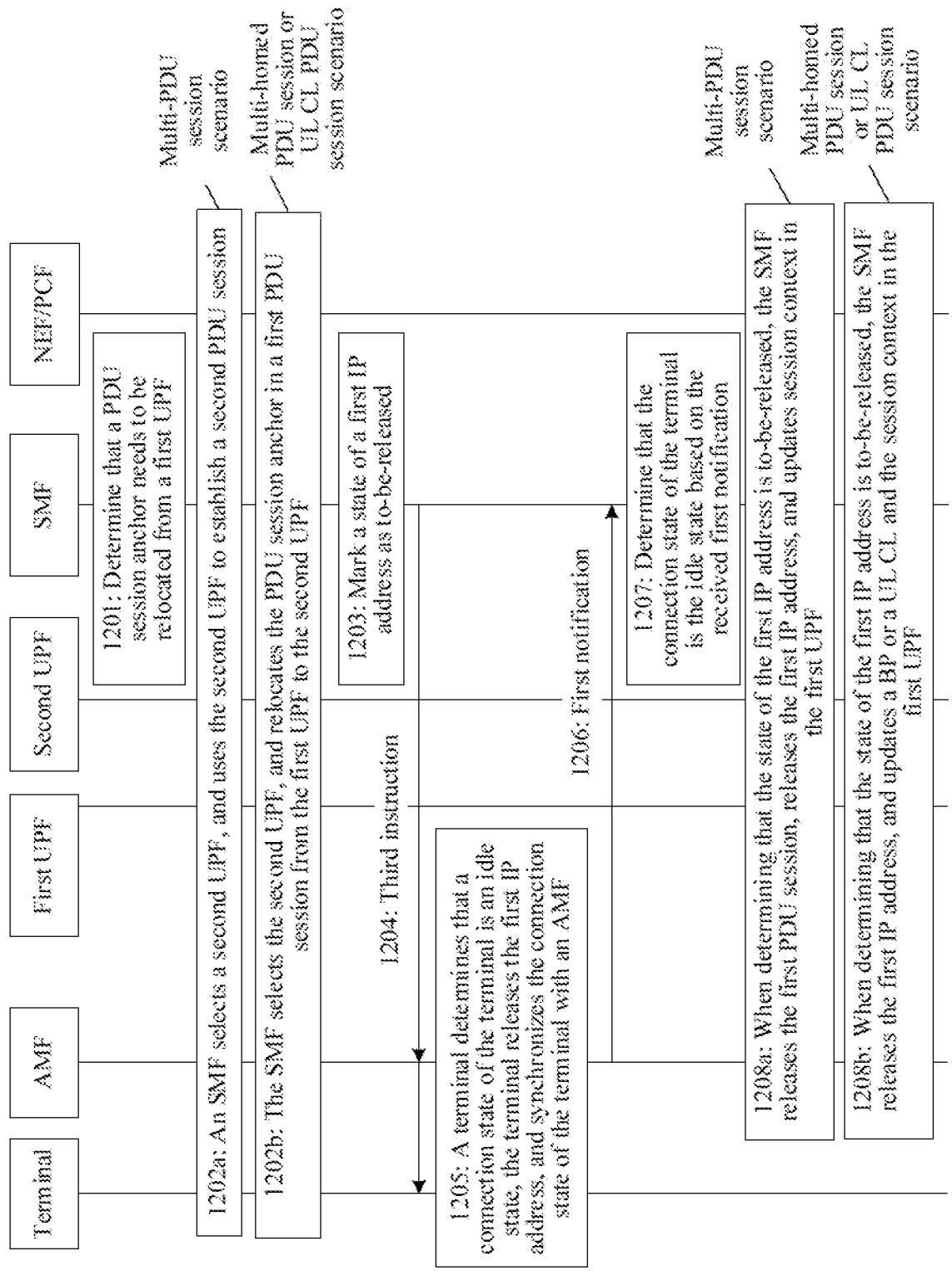
FIG. 10 is a schematic diagram of communication of another method for releasing an IP address according to an embodiment of this application.

Embodiment 2 provides a method for releasing an IP address, and as shown in FIG. 10, the method may include: steps 1201 to 1208*b*.

Steps 1201 to 1204 may refer to description of steps 1101 to 1104 in FIG. 9.

Step 1201 is the same as step 1101; when an application scenario of the method is a multi-PDU session scenario, step 1202*a* is performed, and step 1202*a* is the same as step 1102*a*; when the application scenario of the method is a multi-homed PDU session or a UL CL PDU session scenario, step 1202*b* is performed, and step 1202*b* is the same as step 1102*b*; step 1203 is the same as step 1103; and step 1204 is the same as step 1104.

1205. A terminal determines that a connection state of the terminal is an idle state, the terminal releases a first IP address, and the terminal synchronizes the connection state of the terminal with an AMF.

The connection state of the terminal may be the idle state or a connected state. It should be noted that once the connection state of the terminal is the idle state, the terminal disconnects all PDU sessions.

1206. The AMF sends a first notification to an SMF.

The first notification includes information that the connection state of the terminal is the idle state.

1207. Based on the received first notification, the SMF determines that the connection state of the terminal is the idle state.

When the application scenario of the method is the multi-PDU session scenario, step 1208*a* is performed, and when the application scenario of the method is the multi-homed PDU session or the UL CL PDU session scenario, step 1208*b* is performed.

1208*a*. When determining that a state of the first IP address is to-be-released, the SMF releases a first PDU session, releases the first IP address, and updates session context in a first UPF.

1208*b*. When determining that the state of the first IP address is to-be-released, the SMF releases the first IP address, and updates a BP or a UL CL and the session context in the first UPF.

Embodiment 3

Figure 11:
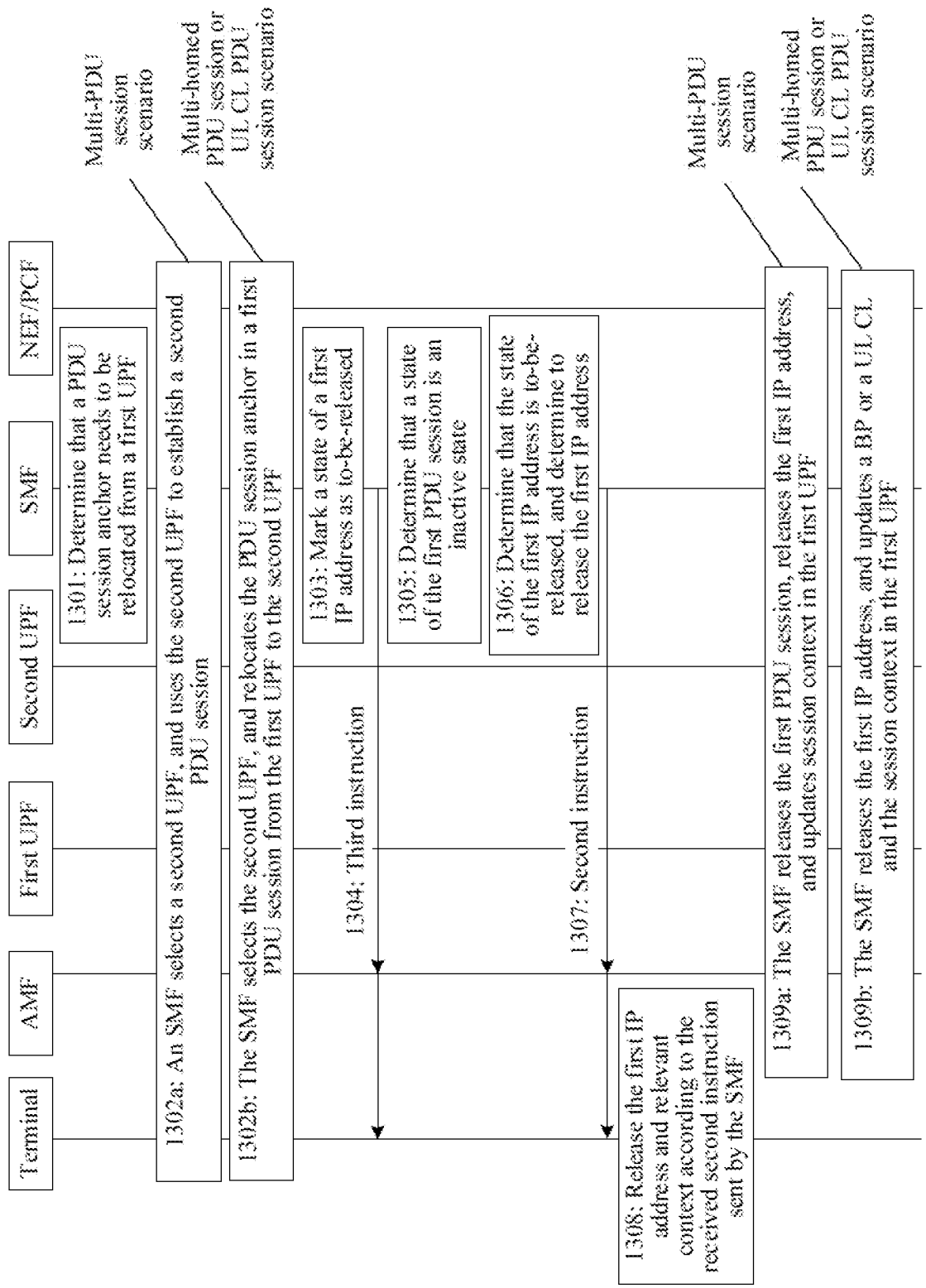
FIG. 11 is a schematic diagram of communication of another method for releasing an IP address according to an embodiment of this application.

Embodiment 3 provides a method for releasing an IP address, and as shown in FIG. 11, the method may include: steps 1301 to 1309*b*.

Steps 1301 to 1304 may refer to description of steps 1101 to 1104 in FIG. 9.

Step 1301 is the same as step 1101; when an application scenario of the method is a multi-PDU session scenario, step 1302*a* is performed, and step 1302*a* is the same as step 1102*a*; when the application scenario of the method is a multi-homed PDU session or a UL CL PDU session scenario, step 1302*b* is performed, and step 1302*b* is the same as step 1102*b*; step 1303 is the same as step 1103; and step 1304 is the same as step 1104.

1305. An SMF determines that a state of a first PDU session is an inactive state.

The state of a PDU session may be an inactive state or an active state. When the state of the PDU session is the inactive state, data on all PDU sessions is no longer transmitted, and in this case, the IP address of a terminal may be released.

Steps 1306 to 1309*b* may refer to description of steps 1108 to 1111*b* in FIG. 9.

Step 1306 is the same as step 1108; step 1307 is the same as step 1109; step 1308 is the same as step 1110; when the application scenario of the method is the multi-PDU session scenario, step 1309*a* is performed, and step 1309*a* is the same as step 1111*a*; and when the application scenario of the method is a multi-homed PDU session or a UL CL PDU session scenario, step 1309*b* is performed, and step 1309*b* is the same as step 1111*b*.

Embodiment 4

Figure 12A:
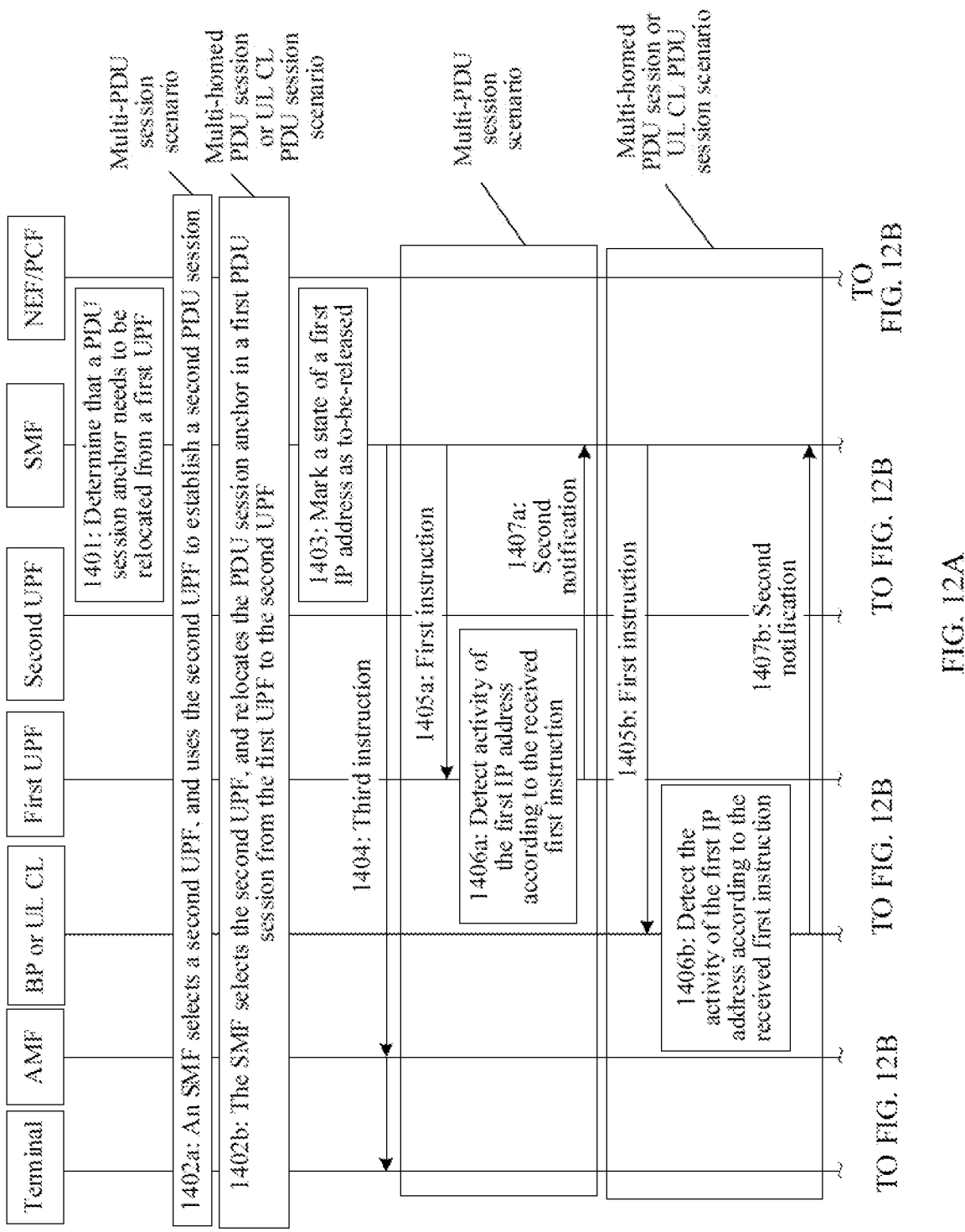
FIG. 12A and FIG. 12B are a schematic diagram of communication of another method for releasing an IP address according to an embodiment of this application.
Figure 12B:
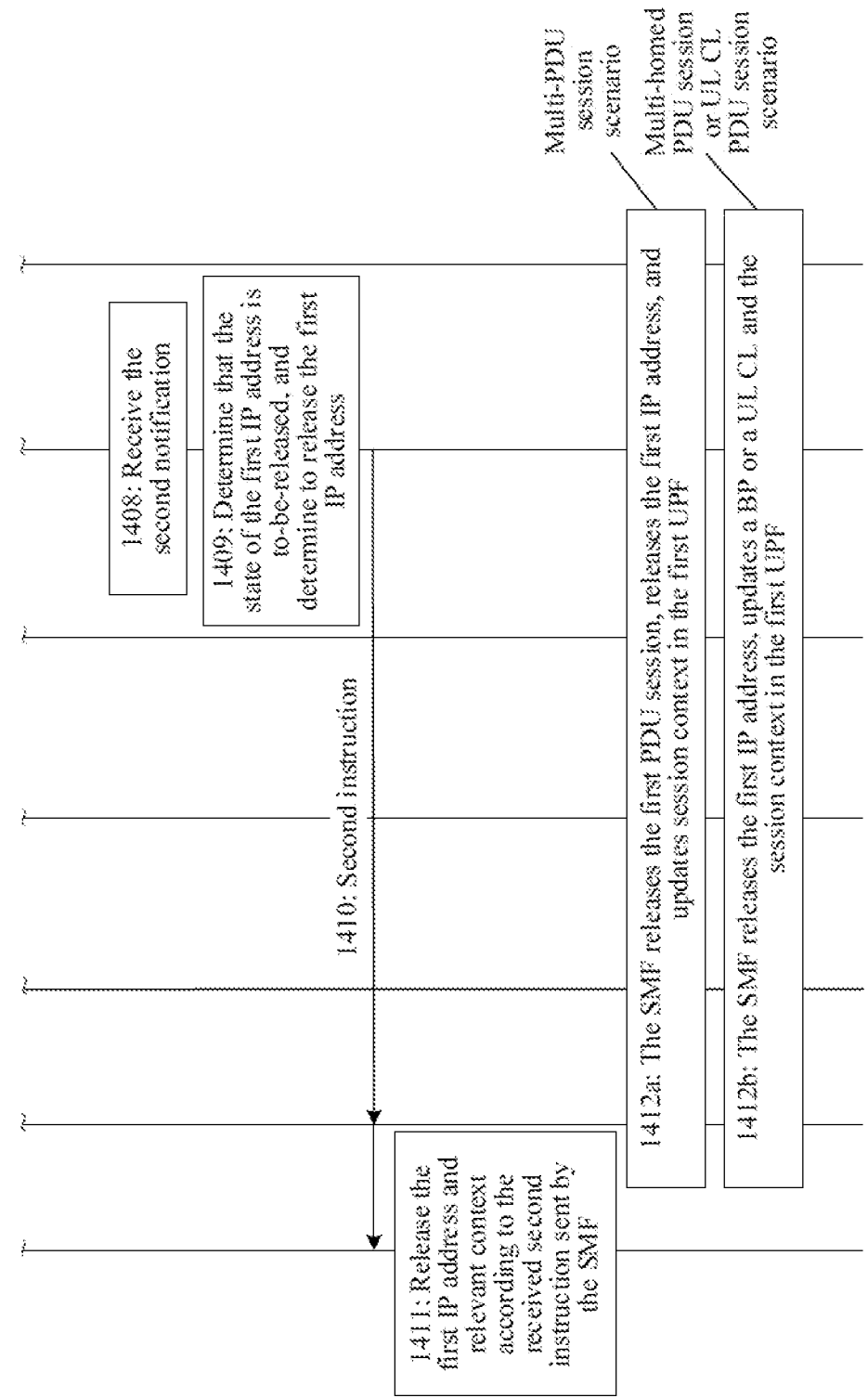

Embodiment 4 provides a method for releasing an IP address, and as shown in FIG. 12A and FIG. 12B, the method may include: steps 1401 to 1412*b*.

Steps 1401 to 1404 may refer to description of steps 1101 to 1104 in FIG. 9.

Step 1401 is the same as step 1101; when an application scenario of the method is a multi-PDU session scenario, step 1402*a* is performed, and step 1402*a* is the same as step 1102*a*; when the application scenario of the method is a multi-homed PDU session or a UL CL PDU session scenario, step 1402*b* is performed, and step 1402*b* is the same as step 1102*b*; and step 1403 is the same as step 1103, and step 1404 is the same as step 1104.

When the application scenario of the method is the multi-PDU session scenario, steps 1405*a* to 1407*a* are performed, and when the application scenario of the method is the multi-homed PDU session or the UL CL PDU session scenario, steps 1405*b* to 1407*b* are performed.

1405*a*. An SMF sends a first instruction to a first UPF.

Specifically, the first instruction is used to instruct the first UPF to detect activity of a first IP address.

1406*a*. The first UPF detects the activity of the first IP address according to the received first instruction.

1407*a*. If the first IP address is detected to be inactive, the first UPF sends a second notification to the SMF.

The second notification includes information that the first IP address is inactive, and the first IP address being inactive may indicate that the first IP address is not used for more than a first time period.

1405*b*. The SMF sends the first instruction to a BP or a CL.

Specifically, the first instruction is used to instinct the BP or the UL CL to detect the activity of the first IP address.

1406*b*. The BP or the UL CL detects the activity of the first IP address according to the received first instruction.

1407*b*. If the first IP address is detected to be inactive, the BP or the UL CL sends the second notification to the SMF.

The second notification includes information that the first IP address is inactive, and the first IP address being inactive may indicate that the first IP address is not used for more than a first time period.

1408. The SMF receives the second notification.

Steps 1409 to 1412*b* may refer to description of steps 1108 to 1111*b* in FIG. 9.

Step 1409 is the same as step 1108; step 1410 is the same as step 1109; step 1411 is the same as step 1110; when the application scenario of the method is the multi-PDU session scenario, step 1412a is performed, and step 1412a is the same as step 1111a; and when the application scenario of the method is the multi-homed PDU session or the UL CL PDU session scenario, step 1412b is performed, and step 1412b is the same as step 1111b.

Embodiment 5

Figure 13:
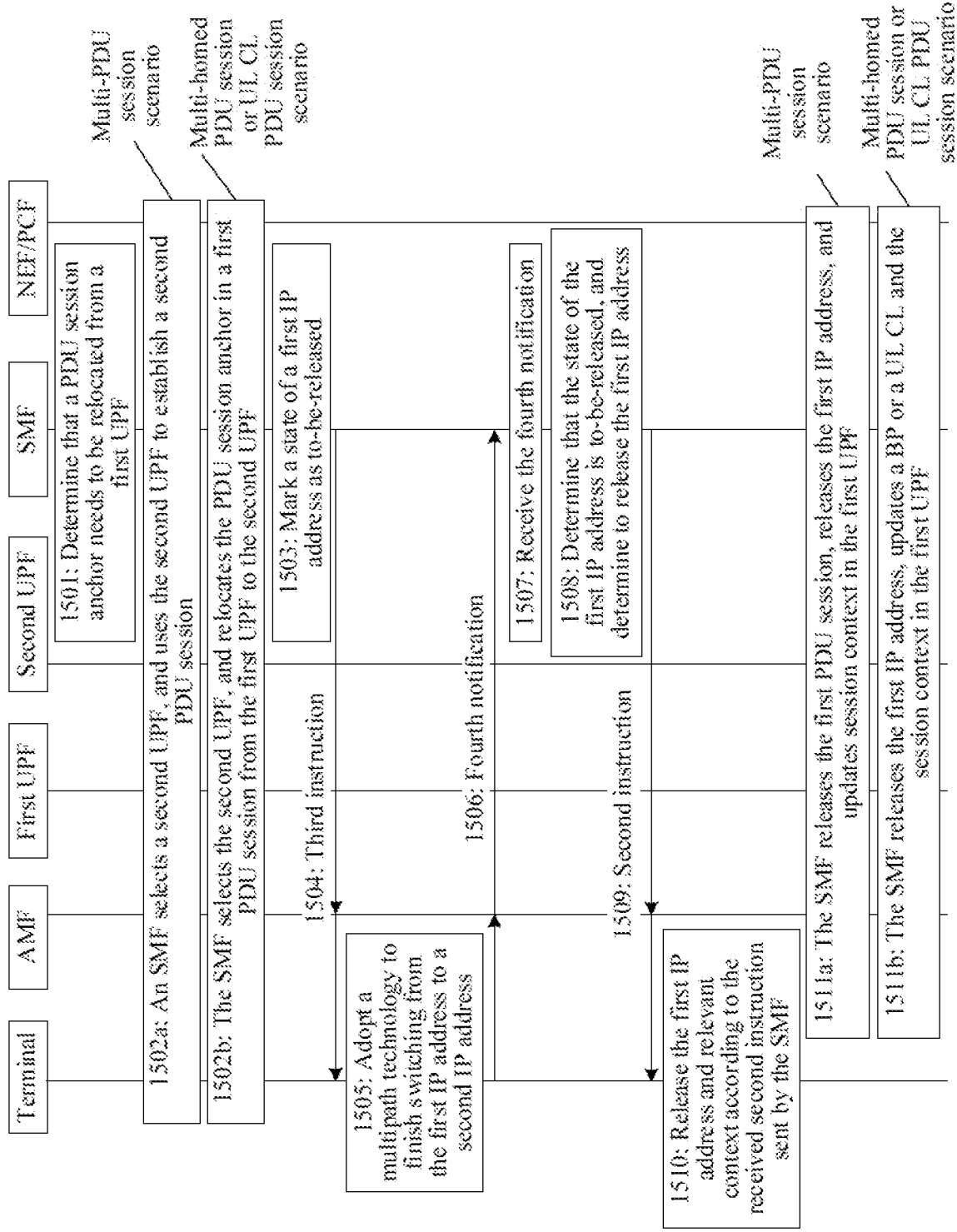
FIG. 13 is a schematic diagram of communication of another method for releasing an IP address according to an embodiment of this application.

Embodiment 5 provides a method for releasing an IP address, and as shown in FIG. 13, the method may include: steps 1501 to 1511b.

Steps 1501 to 1504 may refer to description of steps 1101 to 1104 in FIG. 9.

Step 1501 is the same as step 1101; when an application scenario of the method is a multi-PDU session scenario, step 1502a is performed, and step 1502a is the same as step 1102a; when the application scenario of the method is a multi-homed PDU session or a UL CL PDU session scenario, step 1502b is performed, and step 1502b is the same as step 1102b; step 1503 is the same as step 1103; and step 1504 is the same as step 1104.

1505. A terminal adopts a multipath technology to finish switching from a first address to a second IP address.

1506. The terminal sends a fourth notification to an SMF.

Specifically, the terminal may first send the fourth notification to an AMF, and the AMF forwards the fourth notification to the SMF. The fourth notification may be included in a NAS message.

1507. The SMF receives the fourth notification sent by the terminal.

Steps 1508 to 1511b may refer to description of steps 1108 to 1111b in FIG. 9.

Step 1508 is the same as step 1108; step 1509 is the same as step 1109; step 1510 is the same as step 1110; when the application scenario of the method is the multi-PDU session scenario, step 1511a is performed, and step 1511a is the same as step 1111a, and when the application scenario of the method is the multi-homed PDU session or the UL CL PDU session scenario, the step 1511b is performed, and step 1511b is the same as step 1111b.

Embodiment 6

In the foregoing Embodiment 1 to Embodiment 5, the first UPF and the second UPF both are controlled by a same SMF. In a multi-homed PDU session and a UL CL PDU session scenario, there is also a following case, that is, after a PDU session anchor is relocated, a second SMF serves a terminal, a first SMF cannot directly exchange information with the terminal any more, the first SMF is an SMF that controls the first UPF in a first PDU session, and the second SMF is an SME that controls the second UPF in the first PDU session. In this case, the first SMF may determine to release a first IP address by receiving information sent by the second SME Specifically, referring to FIG. 14, the method may include the following steps.

1601. The first SMF determines that the PDU session anchor needs to be relocated from the first UPF.

Before step 1601, there has been a first PDU session, and the terminal uses the first IP address to transmit a service data flow in the first PDU session.

The method fix the first SMF determining that the PDU session anchor needs to be relocated from the first UPF may refer to step 1101 in the foregoing description, which is not described herein again.

1602. An AMF selects the second SME

Figure 14:
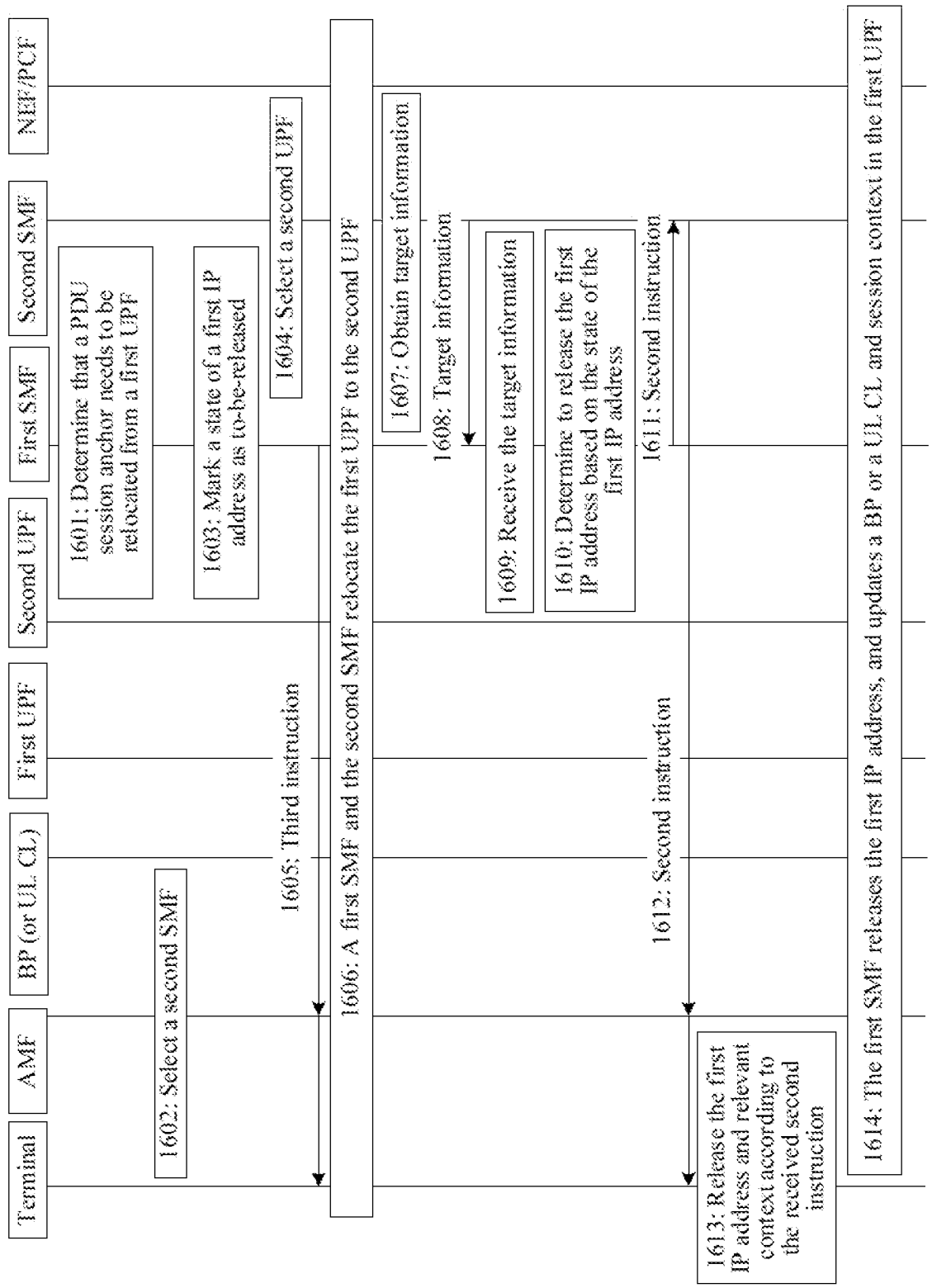
FIG. 14 is a schematic diagram of communication of another method for releasing an IP address according to an embodiment of this application.

The second SMF may be selected by the AMF, or may be selected by the first SMF. FIG. 14 is drawn by taking that the second SMF is selected by the AMF as an example.

1603. The first SMF marks a state of the first IP address as to-be-released.

1604. The second SMF selects the second UPF.

The second SMF, specifically based on a load of a UPF, a network load, or a distance from the terminal to the UPF, may preferably select the second UPF among a plurality of UPFs.

Step 1603 and step 1604 are performed in a random sequence.

1605. The first SMF sends a third instruction to the terminal.

1606. The first SMF and the second SMF relocate the first UPF to the second UPF.

The third instruction is used to instruct the terminal to release the first IP address when the terminal enters an idle state, and the third instruction may be included in a NAS message. Specifically, the SMF may first send the third instruction to the AMF, and the AMF forwards the third instruction to the terminal.

1607. The second SMF obtains target information.

Specifically, the target information may be one or more of the first notification, the second notification, the third notification, the fourth notification, and the fifth notification in the foregoing description.

1608. The second SMF sends the target information to the first SMF.

1609. The first SMF receives the target information.

1610. The first SMF, based on the state of the first IP address, determines to release the first IP address.

1611. The first SMF sends a second instruction to the second SMF.

It should be noted that the terminal can only communicate with the second SMF in this scenario, and therefore, the first SMF needs to forward the second instruction to the terminal through the second SMF.

1612. The second SMF forwards the received second instruction to the terminal.

Specifically, the second SMF may first send the second instruction to the AMF, and the AMF forwards the second instruction to the terminal.

1613. The terminal releases the first IP address and relevant context according to the received second instruction sent by the second SMF.

1614. The first SMF releases the first IP address, and updates a BP or a UL CL and session context in the first UPF.

Beneficial effects of Embodiment 1 to Embodiment 6 may refer to the foregoing description, and this is not described herein again.

It should be noted that in the embodiments of this application, the first user plane function entity is denoted as the first UPF, and the second user plane function entity is denoted as the second UPF. When a step in the accompanying drawings involves a plurality of function entities, it is represented that in an implementation process of the step, an information exchange with one or more of the plurality of the function entities may need to be performed. For example, referring to FIG. 9, in an implementation process of step 1102a, the SMF may need to exchange information with one or more of the terminal, the AMF, the first UPF, the second UPF, and the NEE/PCF.

The foregoing mainly describes the solutions according to the embodiments of this application from the perspective of interaction between network elements. It may be understood that to implement the foregoing functions, each network element such as the first network device, the second network device, or the apparatus (for example, the terminal) includes a corresponding hardware structure and/or a software module to execute each function. A person of ordinary skill in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The embodiments of this application, based on the foregoing examples of the methods, may perform a functional unit division on the first network device, the second network device, the apparatus, and the like. For example, each functional unit may be divided based on each function, or two or more than two functions may be integrated in a processing unit. The foregoing integrated unit may be implemented in a form of hardware, or may be implemented in a form of a software functional unit. It should be noted that, in the embodiments of this application, unit division is an example, and is merely a logical function division. In actual implementation, another division manner may be used.

Figure 15:
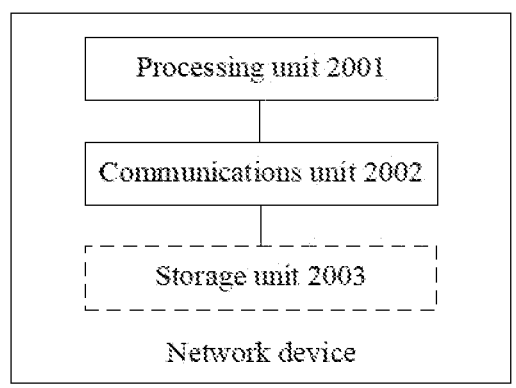
FIG. 15 is a schematic structural diagram of a network device according to an embodiment of this application.

When the integrated unit is used. FIG. 15 is a possible schematic structural diagram of the network device involved in the foregoing embodiments. The network device includes a processing unit 2001 and a communications unit 2002, and may further include a storage unit 2003. The schematic structural diagram in FIG. 15 may be used to represent a structure of the first network device, the second network device, the third network device, the fourth network device, or the fifth network device involved in the foregoing embodiments.

When the schematic structural diagram in FIG. 15 is used to represent the structure of the first network device involved in the foregoing embodiments, the processing unit 2001 is configured to control and manage an action of the first network device. For example, the processing unit 2001 is used to support the first network device to execute procedures 1001 to 1003 in FIG. 8, procedures 1101 to 1104, 1107 to 1109, and 1111a and 1111b in FIG. 9, procedures 1201 to 1204 and 1207 to 1208b in FIG. 10, procedures 1301 to 1307, and 1309a and 1309b in FIG. 11, procedures 1401 to 1405a, 1405b, 1408 to 1410, and 1412a and 1412b in FIG. 12A and FIG. 12B, procedures 1501 to 1504, 1507 to 1509, and 1511a and 1511b in FIG. 13, procedures 1601, 1603, 1605, 1606, 1609 to 1611, and 1614 in FIG. 14, and/or an action performed by the first network device in another process described in the embodiments of this application. The communications unit 2002 is configured to support communication of the first network device with another network entity, for example, communication with the terminal, the AMF, or the like shown in FIG. 9. The storage unit 2003 is configured to store a program code and data of the first network device.

When the schematic structural diagram in FIG. 15 is used to represent the structure of the second network device involved in the foregoing embodiments, the processing unit 2001 is configured to control and manage an action of the second network device. For example, the processing unit 2001 is used to support the second network device to execute procedures 1102a and 1102b, 1104, 1109, and 1111a and 1111b in FIG. 9, procedures 1202a, 1202b, 1204, 1205, 1206, and 1208a and 1208b in FIG. 10, procedures 1302a, 1302b, 1304, 1307, and 1309a and 1309b in FIG. 11, procedures 1402a, 1402b, 1404, 1410, and 1412a and 1412b in FIG. 12A and FIG. 12B, procedures 1502a, 1502b, 1504, 1506, 1509, and 1511a and 1511b in FIG. 13, procedures 1602, 1605, 1606, 1612, and 1614 in FIG. 14, and/or an action performed by the second network device in another process described in the embodiments of this application. The communications unit 2002 is configured to support communication of the second network device with another network entity, for example, communication with the terminal, the SMF, and the like network entities shown in FIG. 9. The storage unit 2003 is configured to store a program code and data of the second network device.

When the schematic structural diagram in FIG. 15 is used to represent the structure of the third network device involved in the foregoing embodiments, the processing unit 2001 is configured to control and manage an action of the third network device. For example, when the PDU session is the multi-PDU session, the third network device may be the first UPF, and the processing unit 2001 is configured to support the third network device to execute procedures 1102a, 1102b, and 1111a and 1111b in FIG. 9, procedures 1202a, 1202b, and 1208a and 1208b in FIG. 10, procedures 1302a, 1302b, and 1309a and 1309b in FIG. 11, procedures 1402a, 1402b, 1406a, 1407a, and 1412a and 1412b in FIG. 12A and FIG. 12B, procedures 1502a, 1502b, and 1511a and 1511b in FIG. 13, procedures 1606 and 1614 in FIG. 14; and when the PDU session is the multi-homed PDU session or the UL CL PDU session, the third network device may be the BP or the UL CL, and the processing unit 2001 is configured to support the third network device to execute procedures 1402a, 1402b, 1406b, 1407b, and 1412a and 1412b in FIG. 12A and FIG. 12B, procedures 1606 and 1614 in FIG. 14, and/or an action performed by the third network device in another process described in the embodiments of this application. The communications unit 2002 is configured to support communication of the third network device with another network entity, for example, communication with the terminal, the SMF, or the like in FIG. 12A and FIG. 12B. The storage unit 2003 is configured to store a program code and data of the third network device.

When the schematic structural diagram in FIG. 15 is used to represent the structure of the fourth network device involved in the foregoing embodiments, the processing unit 2001 is configured to control and manage an action of the fourth network device. For example, the processing unit 2001 is configured to support the fourth network device to execute procedure 1105 in FIG. 9, and/or an action performed by the fourth network device in another process described in the embodiments of this application. The communications unit 2002 is configured to support communication of the fourth network device with another network entity, for example, communication with the NEF/PCF or the like in FIG. 9. The storage unit 2003 is configured to store a program code and data of the fourth network device.

When the schematic structural diagram in FIG. 15 is used to represent the structure of the fifth network device involved in the foregoing embodiments, the processing unit 2001 is configured to control and manage an action of the fifth network device. For example, the processing unit 2001 is configured to support the fifth network device to execute procedures 1604, 1606, 1607, 1608, 1612, and 1614 in FIG. 14, and/or an action performed by the fifth network device in another process described in the embodiments of this application. The communications unit 2002 is configured to support communication of the fifth network device with another network entity, for example, communication with the first SMF, the terminal, or the like in FIG. 14. The storage unit 2003 is configured to store a program code and data of the fifth network device.

The processing unit 2001 may be a processor or a controller, such as may be a central processing unit (CPU), a general-purpose processor, a digital signal processor (DSF), an application-specific integrated circuit (ASIC), a field programmable gate array (FPGA), or another programmable logic device, a transistor logic device, a hardware component, or a combination thereof. The processing unit 2001 may implement or execute various example logical blocks, modules, and circuits described with reference to content disclosed in this application. The processor may further be a combination implementing a computing function, for example, a combination including one or more microprocessors, or a combination of the DSP and a microprocessor. The communications unit 2002 may be a communications interface, a transceiver, a transceiver circuit, or the like. The communications interface is a general term and may include one or more interfaces. The storage unit 2003 may be a memory.

Figure 16:
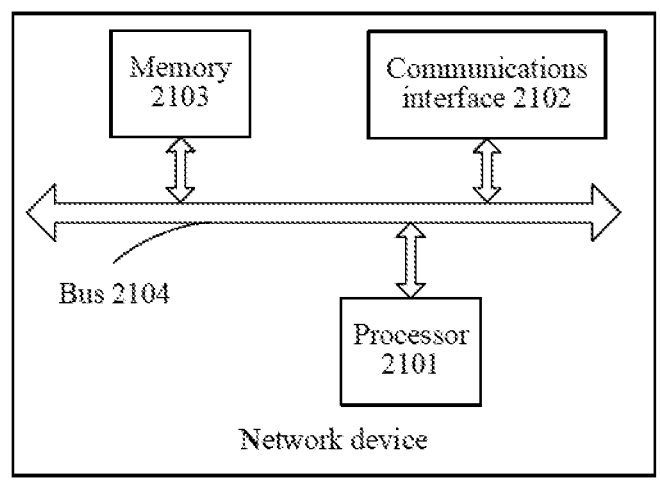
FIG. 16 is a schematic structural diagram of a network device according to an embodiment of this application.

When the processing unit 2001 is the processor, the communications unit 2002 is the communications interface, and the storage unit 2003 is the memory, the network device involved in the embodiments of this application may be a network device shown in FIG. 16.

Referring to FIG. 16, the network device includes: a processor 2101, a communications interface 2102, and a memory 2103. Optionally, the network device may further include a bus 2104. The communications interface 2102, the processor 2101, and the memory 2103 may be connected to each other by using the bus 2104; and the bus 2104 may be a peripheral component interconnect (PCI) bus, an extended industry standard architecture (EISA) bus, or the like. The bus 2104 may be classified into an address bus, a data bus, a control bus, and the like. For ease of representation, only one thick line is used to represent the bus in FIG. 16, but this does not mean that there is only one bus or only one type of bus.

Figure 17:
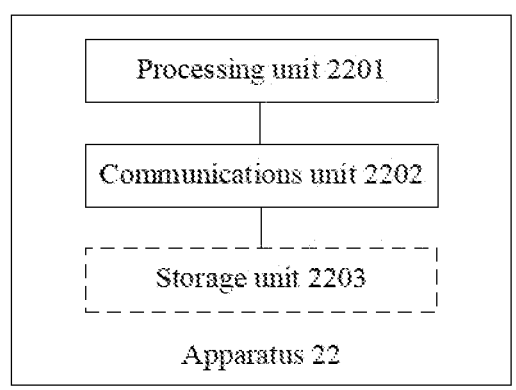
FIG. 17 is a schematic structural diagram of an apparatus according to an embodiment of this application.

In a case in which the integrated unit is used, FIG. 17 is a possible schematic structural diagram of the apparatus involved in the foregoing embodiment. Referring to FIG. 17, an apparatus 22 includes: a processing unit 2201 and a communications unit 2202. The processing unit 2201 is configured to control and manage an action of the apparatus 22. For example, the processing unit 2201 is configured to support the apparatus 22 to execute procedures 1102a, 1102b, and 1110 in FIG. 9, procedures 1202a, 1202b, and 1205 in FIG. 10, procedures 1302a, 1302b, and 1308 in FIG. 11, procedures 1402a, 1402b, and 1411 in FIG. 12A and FIG. 12B, procedures 1502a, 1502b, 1505, 1506, and 1510 in FIG. 13, procedures 1606 and 1613 in FIG. 14, and/or an action performed by the apparatus 22 in another process described in the embodiments of this application. The communications unit 2202 is configured to support communication of the apparatus 22 with another network device. Referring to FIG. 17, the apparatus 22 may further include a storage unit 2203, which is configured to store a program code and data of the apparatus 22.

The processing unit 2201 may be a processor or a controller, such as may be a CPU, a general purpose processor, a DSP, an ASIC, an FPGA, or another programmable logic device, a transistor logic device, a hardware component, or any combination thereof. The processing unit 2201 may implement or execute various example logical blocks, modules, and circuits described with reference to content disclosed in this application. The processor may further be a combination implementing a computing function, for example, a combination including one or more microprocessors, or a combination of the DSP and a microprocessor. The communications unit 2202 is a transceiver, a transceiver circuit, or the like. The storage unit 2203 may be a memory.

Figure 18:
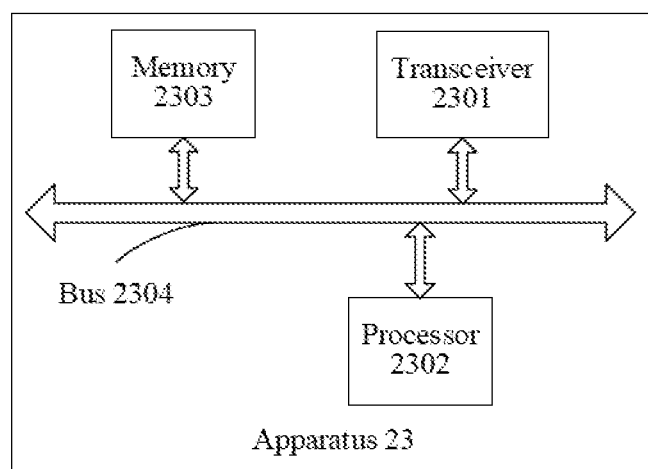
FIG. 18 is a schematic structural diagram of an apparatus according to an embodiment of this application.

When the processing unit 2201 is the processor, the communications unit 2202 includes a transmitter and/or a receiver, and the storage unit 2203 is the memory, the apparatus involved in the embodiments of this application may be an apparatus shown in FIG. 18.

FIG. 18 is a simplified schematic diagram of a possible design structure of an apparatus 23 involved in the embodiments of this application. As shown in FIG. 18, the apparatus 23 includes a transceiver 2301, a processor 2302, and a memory 2303. Optionally, the apparatus 23 may further include a bus 2304. The processor 2302 may also be a controller.

The processor 2302 controls and manages an action of the apparatus 23, and is configured to perform a processing process performed by the apparatus 23 in the embodiments of this application. For example, procedures 1102a, 1102b, and 1110 in FIG. 9, procedures 1202a, 1202b, and 1205 in FIG. 10, procedures 1302a, 1302b, and 1308 in FIG. 11, procedures 1402a, 1402b, and 1411 in FIG. 12A and FIG. 12B, procedures 1502a, 1502b, 1505, 1506, and 1510 in FIG. 13, procedures 1606 and 1613 in FIG. 14, and/or an action performed by the apparatus 23 in another process described in the embodiments of this application.

For example, the apparatus shown in FIG. 17 or FIG. 18 may be a terminal.

An embodiment of this application further provides a computer-readable storage medium. The computer-readable storage medium includes an instruction, and when run on a computer, the instruction enables the computer to perform the foregoing method.

An embodiment of this application further provides a computer program product including an instruction. When run on a computer, the instruction enables the computer to perform the foregoing method.

An embodiment of this application further provides an apparatus, and the apparatus exists in a product form of a chip. The apparatus includes a processor, a memory, and a transceiver component, where the transceiver component includes an input/output circuit, the memory is configured to store a computer-executable instruction, and the processor implements the foregoing method by executing the computer-executable instruction stored in the memory.

An embodiment of this application further provides a communications system, at least including: a first network device and an apparatus, and further including at least one of a second network device, a third network device, a fourth network device, or a fifth network device. The first network device may be any one of the first network devices according to the foregoing embodiments, the second network device may be any one of the second network devices according to the foregoing embodiments, the third network device may be any one of the third network devices according to the foregoing embodiments, the fourth network device may be any one of the fourth network devices according to the foregoing embodiments, the fifth network device may be any one of the fifth network devices according to the foregoing embodiments, the apparatus may be any one of the apparatuses according to the foregoing embodiments, and the apparatus may be a terminal.

A backup server according to the embodiments of this application may be used to perform the foregoing method for implementing data transformation in a cloud data center, and therefore, the technical effects obtained by the method may refer to the foregoing method embodiments, which is not described herein again.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or one or more data storage devices including a server or a data center integrated by the medium. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely description of examples of this application defined by the accompanying claims, and are considered to cover any of or all modifications, variations, combinations or equivalents in the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for releasing an Internet protocol (IP) address, comprising:

determining, by a first network device comprising a first session management function network device, that a packet data unit (PDU) session anchor needs to be relocated from a first user plane function entity, wherein the first user plane function entity is a PDU session anchor of a first PDU session of a terminal;

determining, by the first network device, that a first IP address of the terminal is no longer used, wherein the first IP address is an IP address used by the terminal in the first PDU session; and releasing, by the first network device, the first IP address, wherein after the determining, by the first network device, that the PDU session anchor needs to be relocated from the first user plane function entity, the method further comprises:

selecting, by the first network device, a second user plane function entity as a PDU session anchor of a second PDU session of the terminal; and the determining, by the first network device, that the first IP address of the terminal is no longer used comprises:

receiving, by the first network device, a fourth notification from a fifth network device comprising a second session management function, wherein the fourth notification notifies the first network device that the terminal has finished switching from the first IP address to a second IP address, and the second IP address is an IP address used by the terminal in the second PDU session.

2. The method according to claim 1, wherein the determining, by the first network device, that the first IP address of the terminal is no longer used comprises one of the following cases:

receiving, by the first network device, a first notification from a second network device or the fifth network device, wherein the first notification notifies the first network device that a connection state of the terminal is an idle state;

determining, by the first network device, that a state of the first PDU session is an inactive state;

receiving, by the first network device, a second notification from a third network device or the fifth network device, wherein the second notification notifies the first network device that the first IP address is inactive; and receiving, by the first network device, a third notification from a fourth network device or the fifth network device, wherein the third notification notifies the first network device that an IP connection of the first IP address is released.

3. The method according to claim 2, wherein before the receiving, by the first network device, the second notification from the third network device, the method further comprises:

sending, by the first network device, a first instruction to the third network device, wherein the first instruction instructs the third network device to detect activity of the first IP address.

4. The method according to claim 1, wherein before the releasing, by the first network device, the first IP address, the method further comprises:

sending, by the first network device, a second instruction to the terminal, wherein the second instruction instructs the terminal to release the first IP address.

5. The method according to claim 1, wherein before the determining, by the first network device, that the first IP address of the terminal is no longer used, the method further comprises:

sending, by the first network device, a third instruction to the terminal, wherein the third instruction instructs the terminal to release the first IP address when the terminal enters an idle state.

6. A method for releasing an Internet protocol (IP) address, comprising:
   determining, by a terminal, that switching from a first IP address to a second IP address has been finished;
   sending, by a fifth network device comprising a second session management function, a fourth notification to a first network device comprising a first session management function, wherein the fourth notification notifies the first network device that the terminal has finished switching from the first IP address to the second IP address, wherein the first IP address is an IP address used by the terminal in a PDU session, and a PDU session anchor of the first PDU session is a first user plane function entity; after the PDU session anchor is relocated from the first user plane function entity to a second user plane function entity, the second IP address is an IP address used by the terminal in a second PDU session, and the second user plane function entity is a PDU session anchor of the second PDU session; or after the PDU session anchor of the first PDU session is relocated from the first user plane function entity to the second user plane function entity, the second IP address is the IP address used by the terminal in the first PDU session.

7. The method according to claim 6, wherein after the determining, by the terminal, that switching from the first IP address to the second IP address has been finished, the method further comprises:
   releasing, by the terminal, the first IP address.

8. The method according to claim 6, wherein after the sending, by the fifth network device, the fourth notification to the first network device, the method further comprises:
   receiving, by the terminal, a second instruction from the first network device, wherein the second instruction instructs the terminal to release the first IP address; and
   releasing, by the terminal, the first IP address according to the second instruction.

9. A first network device operating a first Session Management Function, comprising:
   a memory, configured to store computer executable program codes; and
   a processor, coupled to the memory;
   wherein the program codes comprise instructions, and when the processor executes the instructions, the instructions enables the first network device to:
      determine that a packet data unit (PDU) session anchor needs to be relocated from a first user plane function entity, wherein the first user plane function entity is the PDU session anchor of a first PDU session of a terminal;
      determine that a first IP address of the terminal is no longer used, wherein the first IP address is an IP address used by the terminal in the first PDU session; and
      release the first IP address,
   wherein the program instructions, when executed by the processor, further cause the first network device to:
      select a second user plane function entity as a PDU session anchor of a second PDU session of the terminal; and
   the first network device determines that the first IP address of the terminal is no longer used by:
      receiving a fourth notification from a fifth network device comprising a second session management function, wherein the fourth notification notifies the first network device that the terminal has finished switching from the first IP address to a second IP address, and the second IP address is an IP address used by the terminal in a second PDU session.

10. The first network device according to claim 9, wherein the first network device determines that the first IP address of the terminal is no longer used according to one of the following cases:
    determining that a state of the first PDU session is an inactive state; or
    receiving a first notification from a second network device or the fifth network device, wherein the first notification notifies the first network device that a connection state of the terminal is an idle state;
    receiving a second notification from a third network device or the fifth network device, wherein the second notification notifies the first network device that the first IP address is inactive; and
    receiving a third notification from a fourth network device or the fifth network device, wherein the third notification notifies the first network device that an IP connection of the first IP address is released.

11. The first network device according to claim 10, wherein the program instructions, when executed by the processor, further cause the first network device to:
    send a first instruction to the third network device, wherein the first instruction instructs the third network device to detect activity of the first IP address.

12. The first network device according to claim 10, wherein the program instructions, when executed by the processor, further cause the first network device to:
    send a second instruction to the terminal, wherein the second instruction instructs the terminal to release the first IP address.

13. The first network device according to claim 10, wherein the program instructions, when executed by the processor, further cause the first network device to:
    send a third instruction to the terminal, wherein the third instruction instructs the terminal to release the first IP address when the terminal enters the idle state.

* * * * *